United States Patent
Skinner et al.

(10) Patent No.: US 6,185,514 B1
(45) Date of Patent: *Feb. 6, 2001

(54) TIME AND WORK TRACKER WITH HARDWARE ABSTRACTION LAYER

(75) Inventors: Gary R. Skinner, Pacific Grove; Michael G. Lehman, Los Altos, both of CA (US)

(73) Assignee: Ricos International, Inc., Irvine, CA (US)

( * ) Notice: Under 35 U.S.C. 154(b), the term of this patent shall be extended for 0 days.

This patent is subject to a terminal disclaimer.

(21) Appl. No.: 09/374,050

(22) Filed: Aug. 13, 1999

Related U.S. Application Data

(63) Continuation-in-part of application No. 08/987,908, filed on Dec. 9, 1997, now Pat. No. 5,963,914, which is a continuation-in-part of application No. 08/732,675, filed on Oct. 15, 1996, now Pat. No. 5,696,702, which is a continuation-in-part of application No. 08/423,029, filed on Apr. 17, 1995, now abandoned.

(51) Int. Cl.[7] .................................................. G06F 3/05
(52) U.S. Cl. ........................................... 702/188; 702/182
(58) Field of Search .................................. 702/182–183, 702/184, 185, 187, 188; 395/750.01–750.08, 828–830, 835–838; 713/300, 310, 320–324, 330, 340; 710/8–10, 15–18

(56) References Cited

U.S. PATENT DOCUMENTS

| | | | |
|---|---|---|---|
| 3,512,159 | 5/1970 | Clark | 346/86 |
| 3,611,423 | 10/1971 | Rutsche | 346/86 |
| 4,516,138 | 5/1985 | Iwasawa et al. | 346/80 |
| 4,819,162 | 4/1989 | Webb, Jr. et al. | 364/401 |
| 5,155,680 | 10/1992 | Wiedemer | 364/406 |
| 5,255,183 | 10/1993 | Katz | 364/406 |
| 5,305,238 | 4/1994 | Starr, III et al. | 364/569 |
| 5,321,838 | 6/1994 | Hensley et al. | 395/700 |
| 5,388,252 * | 2/1995 | Dreste et al. | 714/46 |
| 5,448,729 | 9/1995 | Murdock | 395/600 |
| 5,696,702 * | 12/1997 | Skinner et al. | 702/186 |
| 5,717,867 * | 2/1998 | Wynn et al. | 702/32 |
| 5,987,614 * | 11/1999 | Mitchell et al. | 713/300 |

OTHER PUBLICATIONS

Levy, Electronic Monitoring in the Workplace: Power Through the Panopricow, http://www.sims.berkeley.edu/impact/S94/students/mike/mike–paper.html, Apr. 1997.*

Chaney, S., "If You Bill Clients By the Hour, TRACK Can Simplify Your Life," PC Magazine, vII, N1, Jan. 11, 1992, p. 387(3).

* cited by examiner

Primary Examiner—Marc S. Hoff.
Assistant Examiner—Craig Steven Miller
(74) Attorney, Agent, or Firm—Keiji Masaki; Donald Wenskay; Steve A. Wong

(57) ABSTRACT

A method and system for automatically collecting and for analyzing information about time and work performed on a computer includes a hardware abstraction layer for monitoring activity on various user input devices. The system also includes the following elements: a data collector for monitoring certain portions of a user's computer activity and for logging into a log file those certain portions of a user's computer activity; a data analyzer for determining by following user-defined rules showing which portions of those certain portions of a user's computer activity constitutes continuous work activities, and how this work should be categorized by project and task with project; and an external interface for building the rules defining work. The data collector includes a resident module, such as a TSR (terminate-and-stay-resident) module, which extends the file system of the computer so that detailed records are kept of file activities. The data collector also routes information about file and keyboard activity, and tabulates and writes such information to a user's disk periodically. The hardware abstraction layer is a software module which is interposed between actual physical user input devices and the data collector.

16 Claims, 14 Drawing Sheets

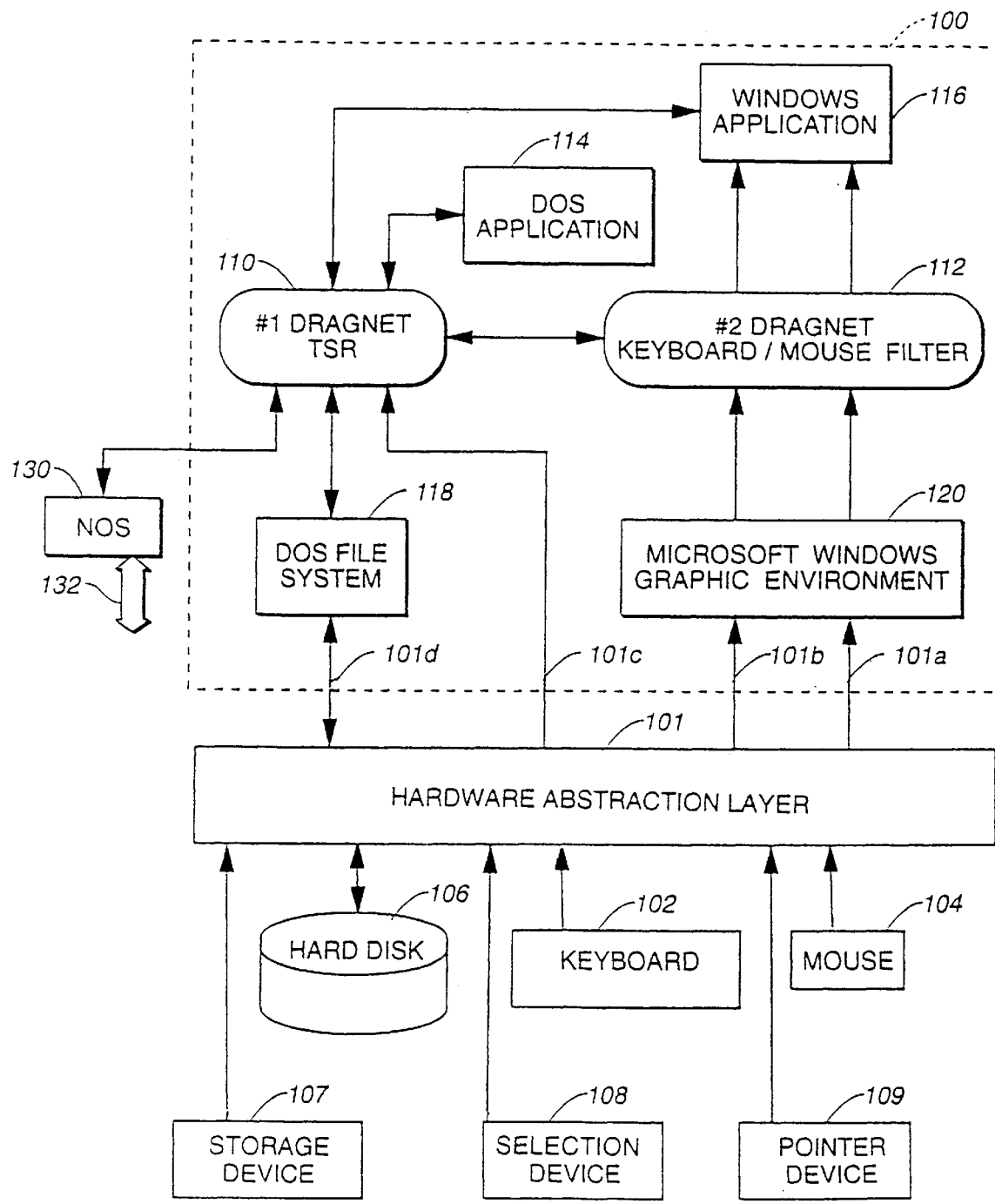
FIG._1

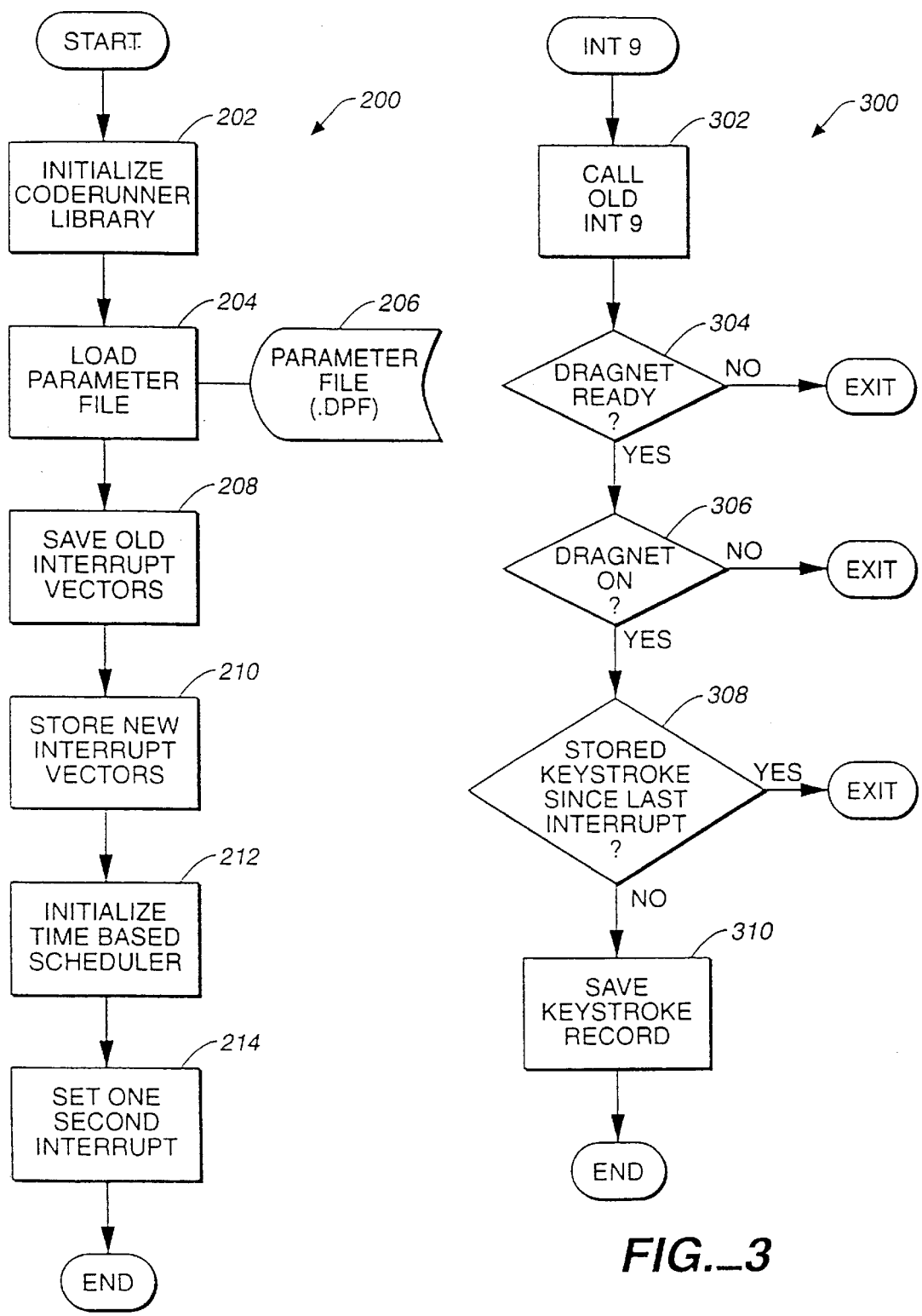

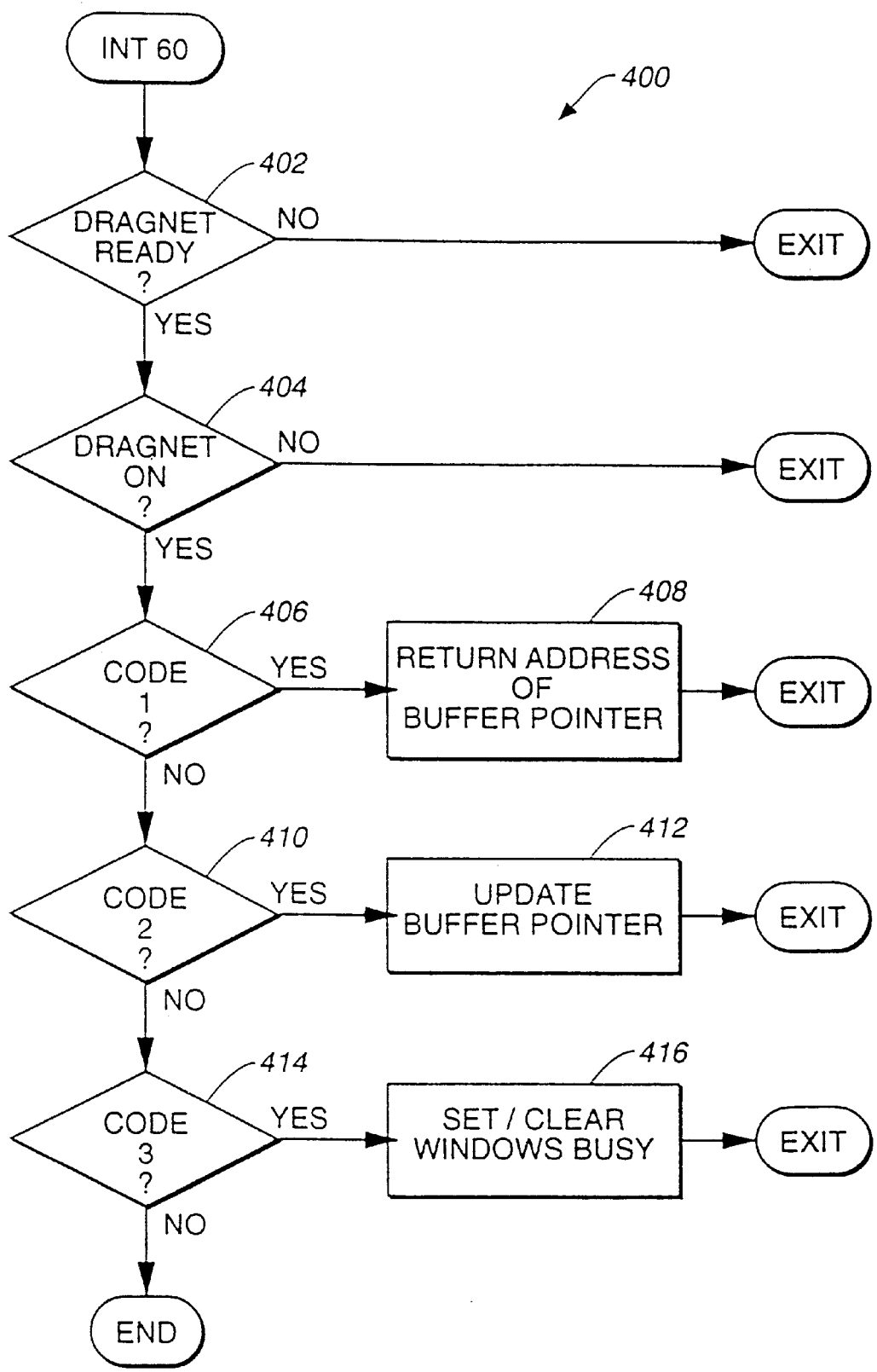
FIG._4

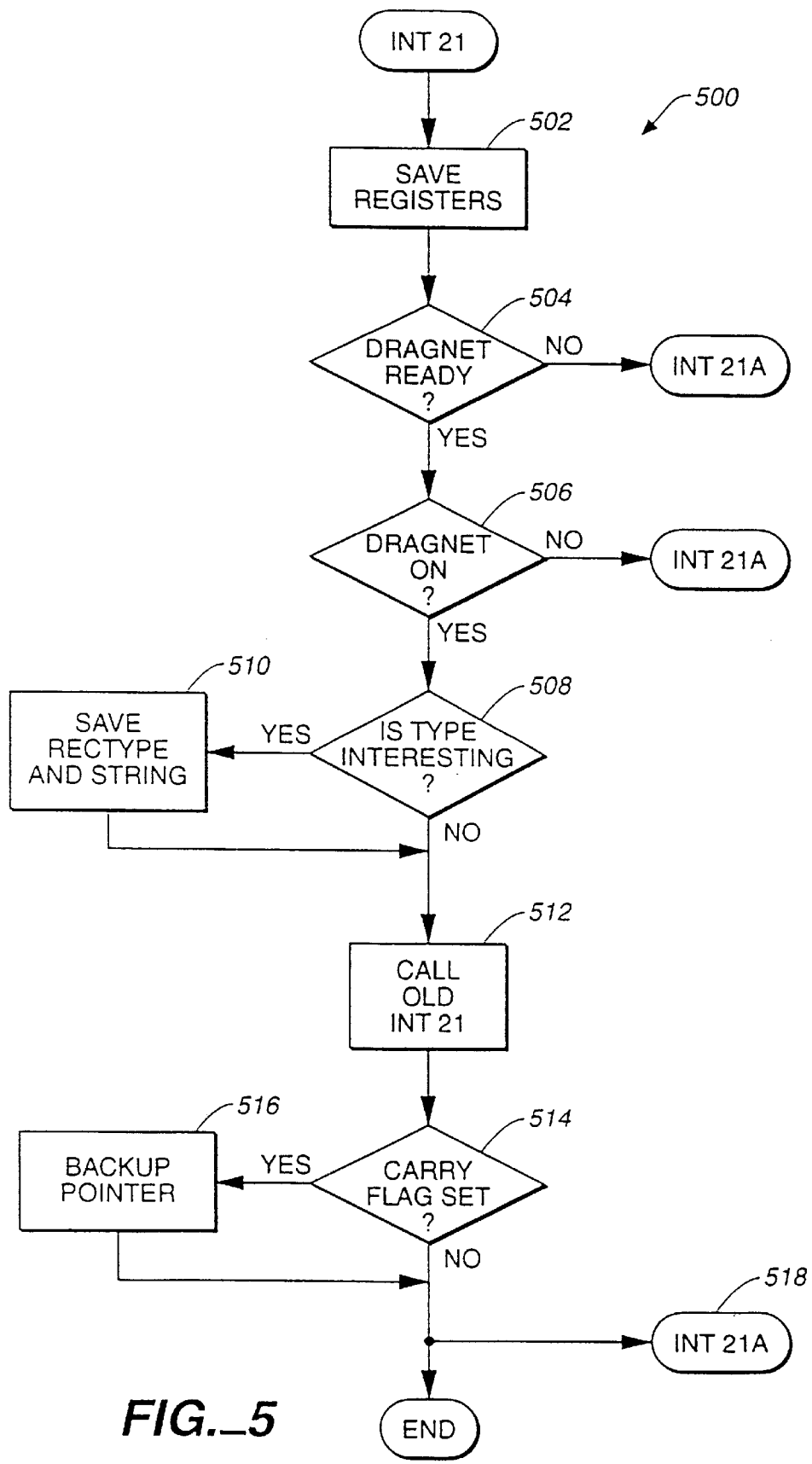
FIG._5

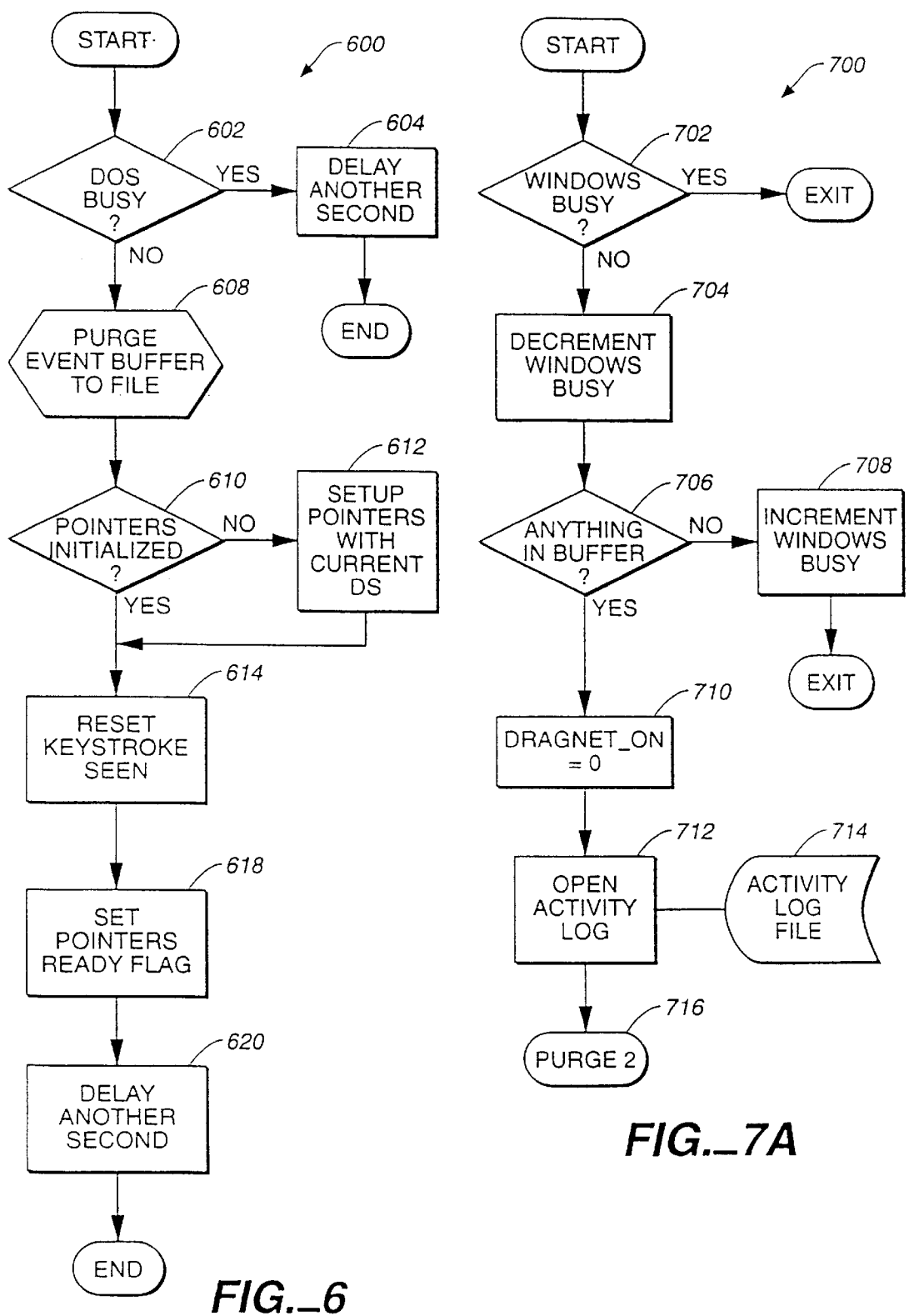
FIG._6
FIG._7A

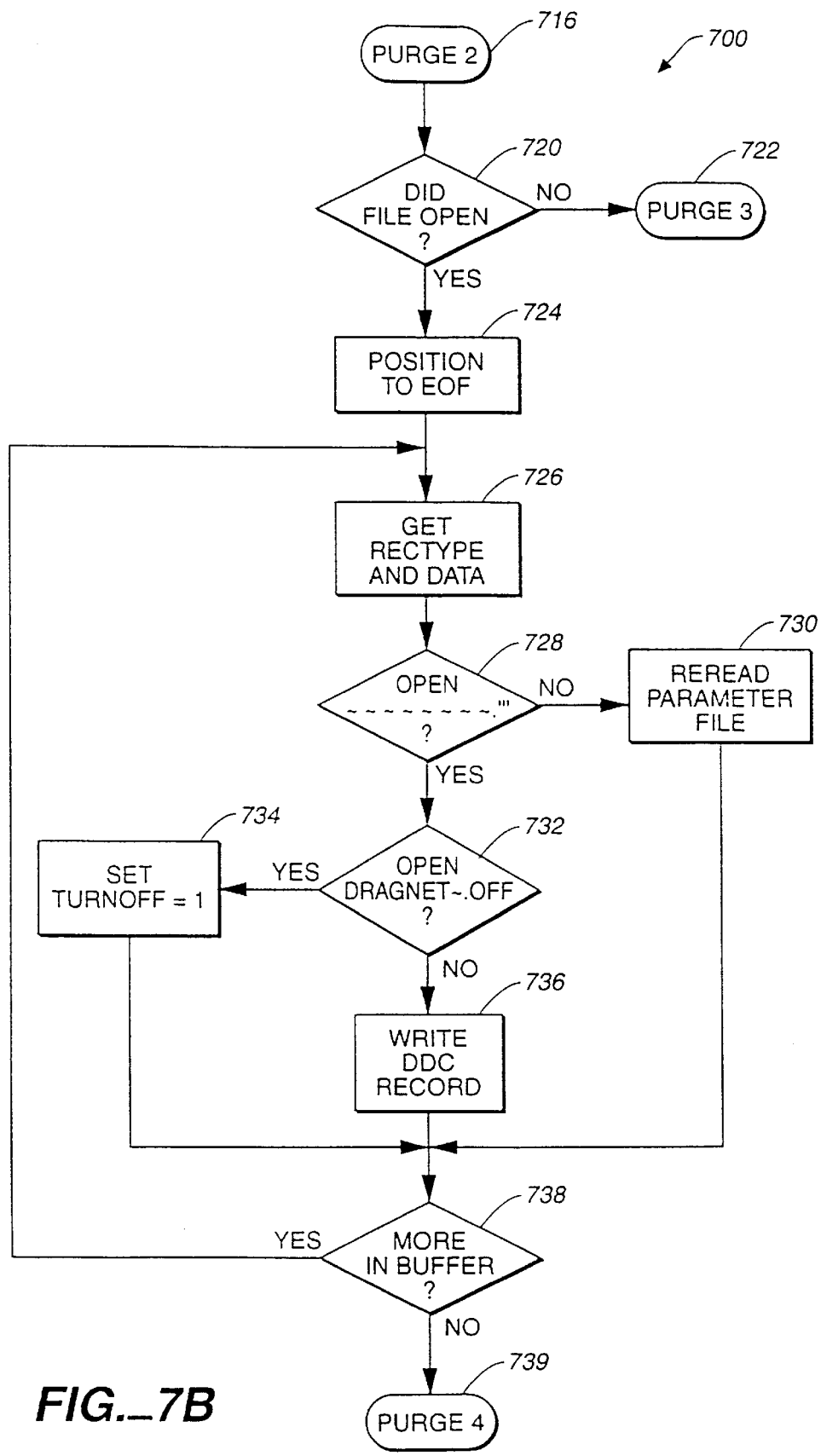
FIG._7B

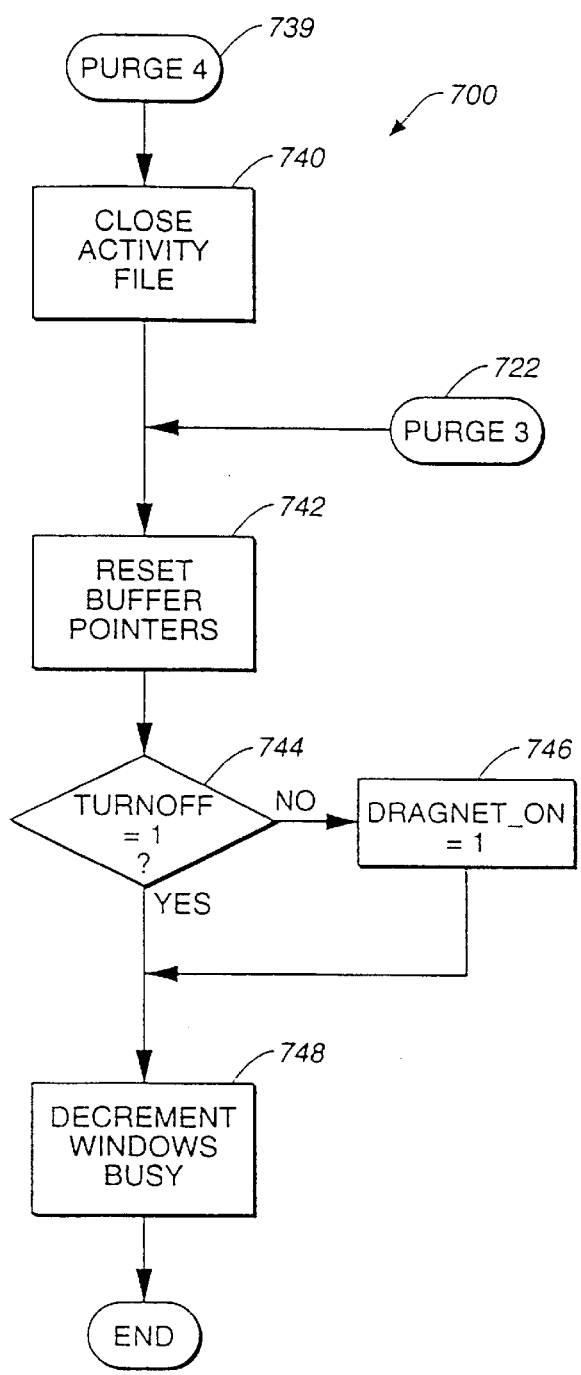
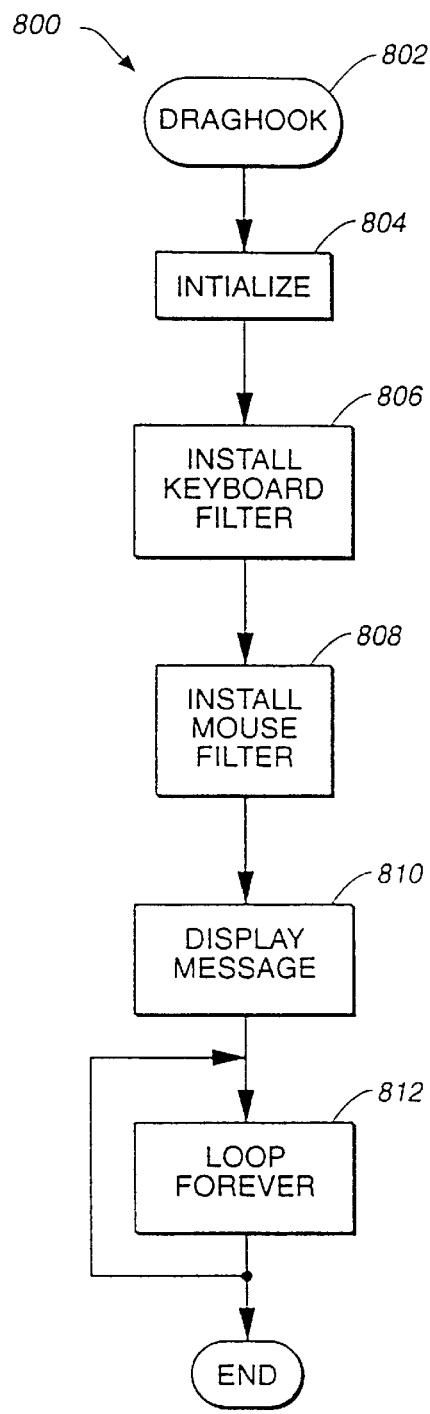
FIG._7C
FIG._8

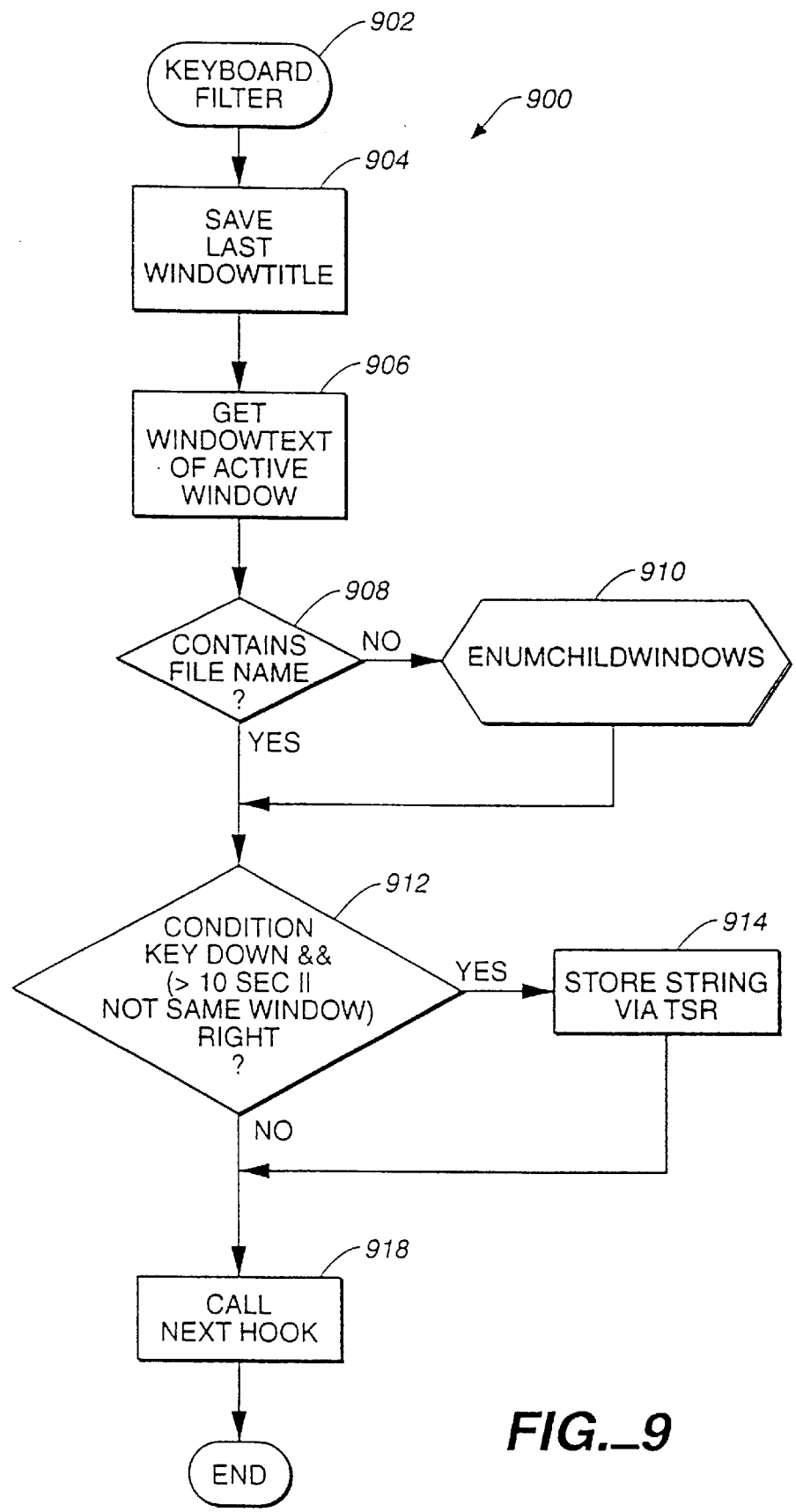
FIG._9

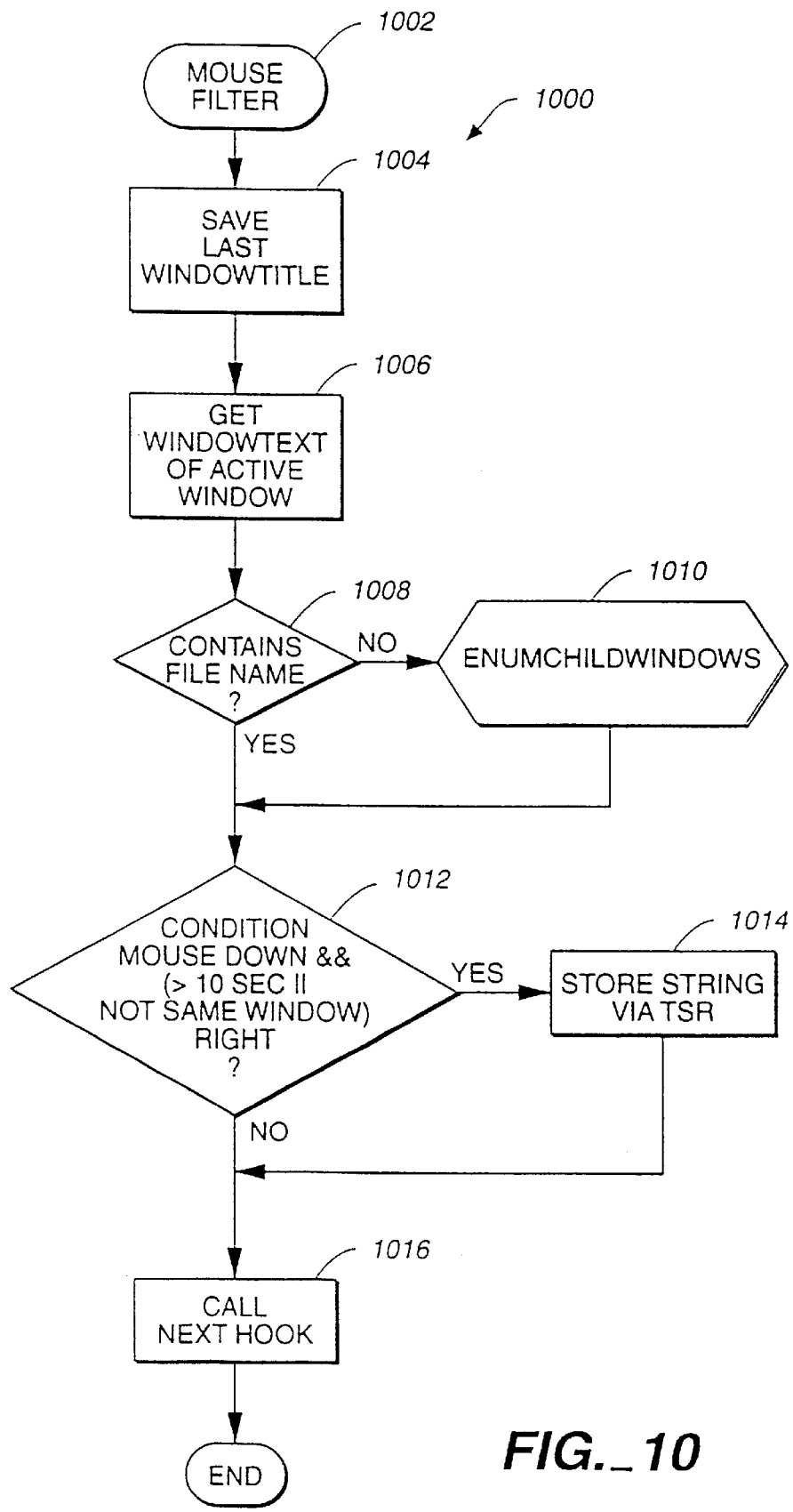
FIG._10

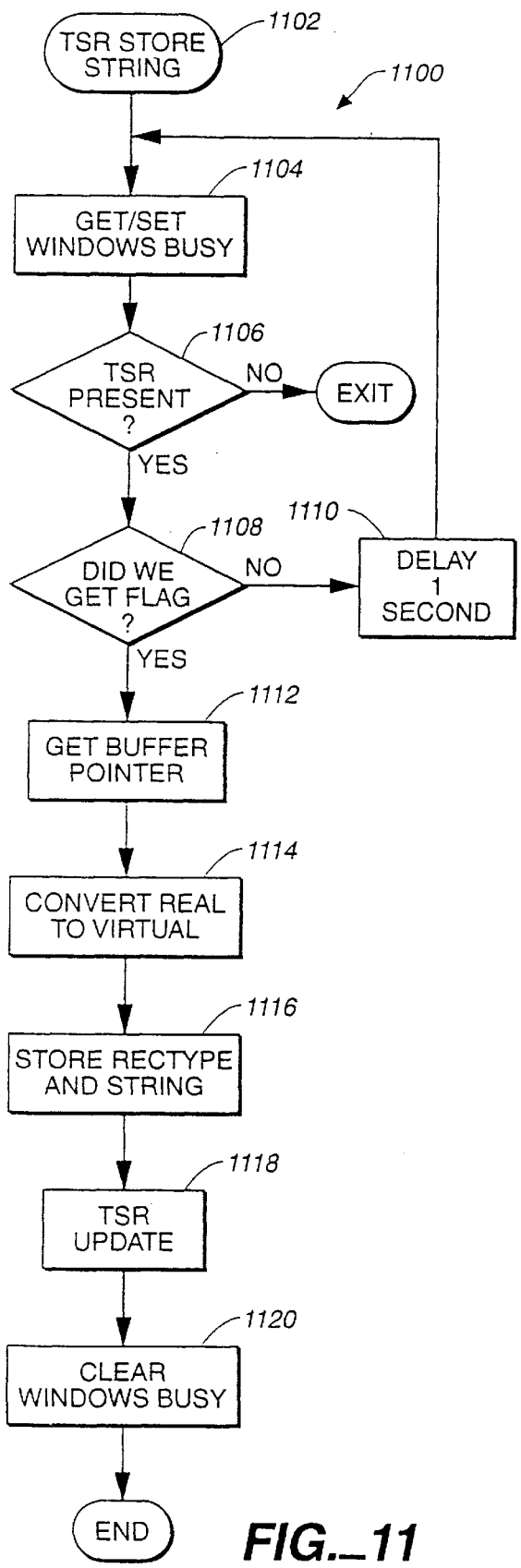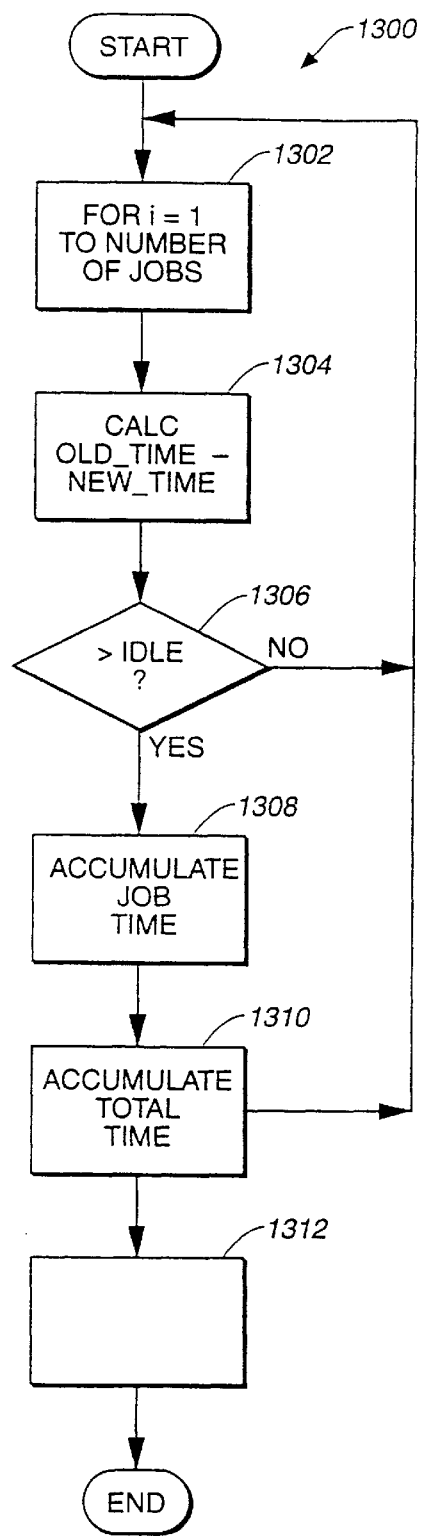
FIG._11
FIG._13

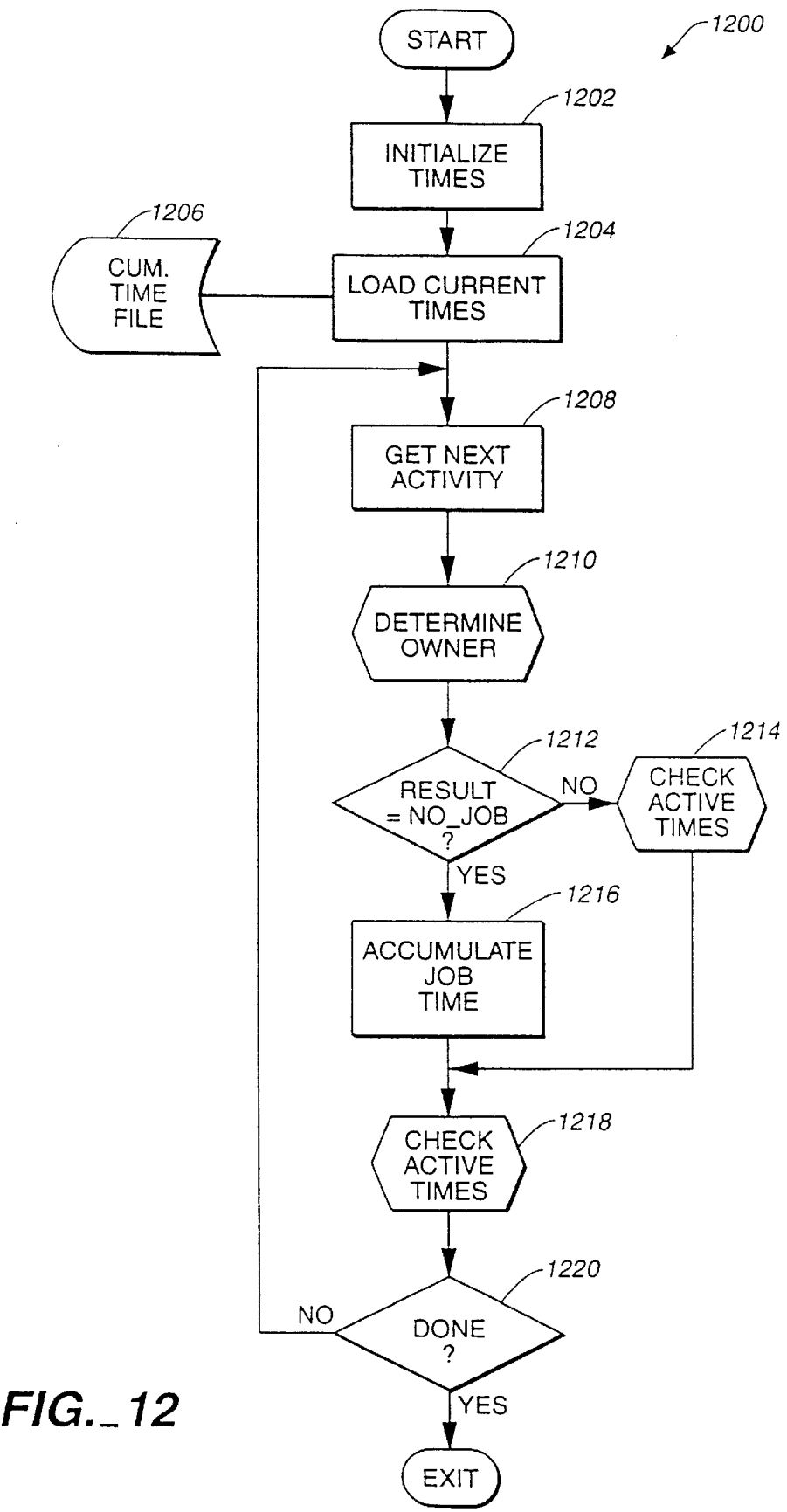
FIG._12

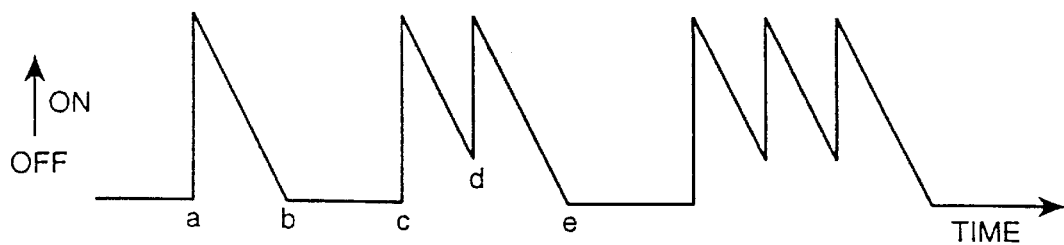
FIG._14
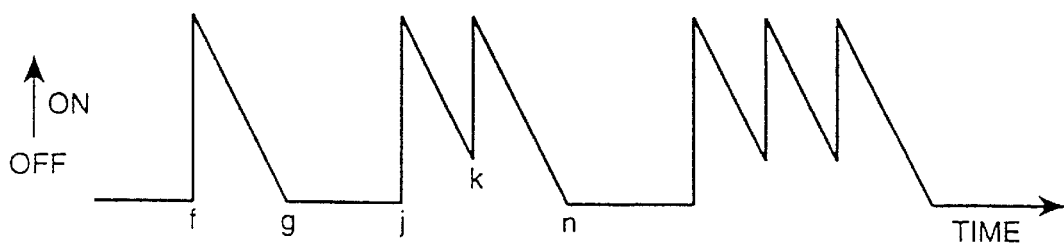
FIG._15A
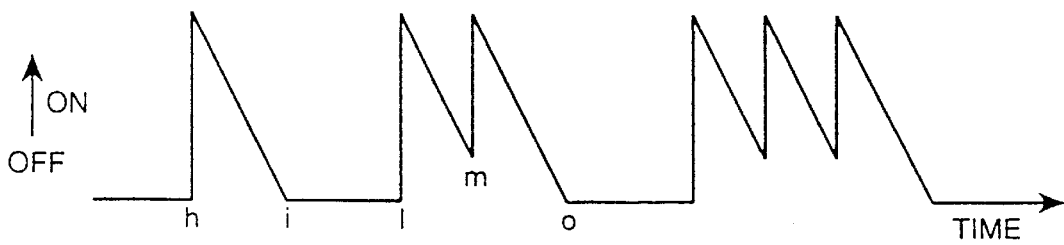
FIG._15B

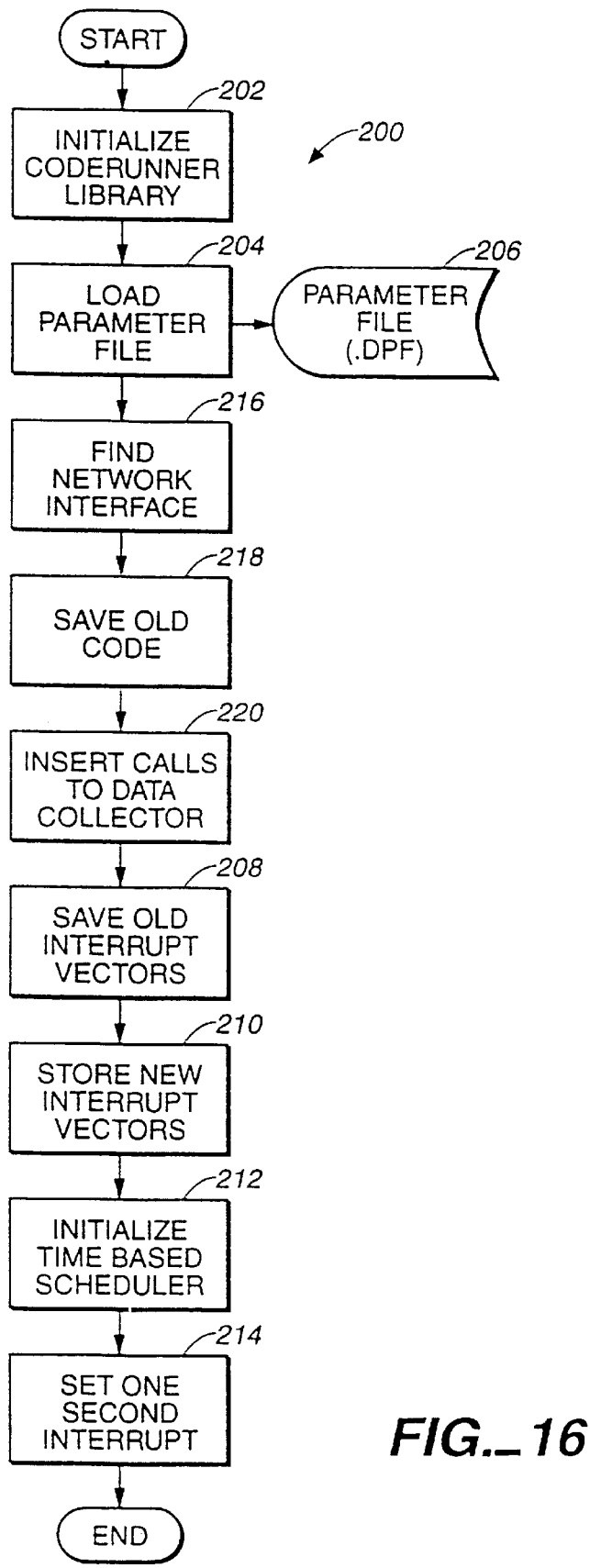
FIG._16

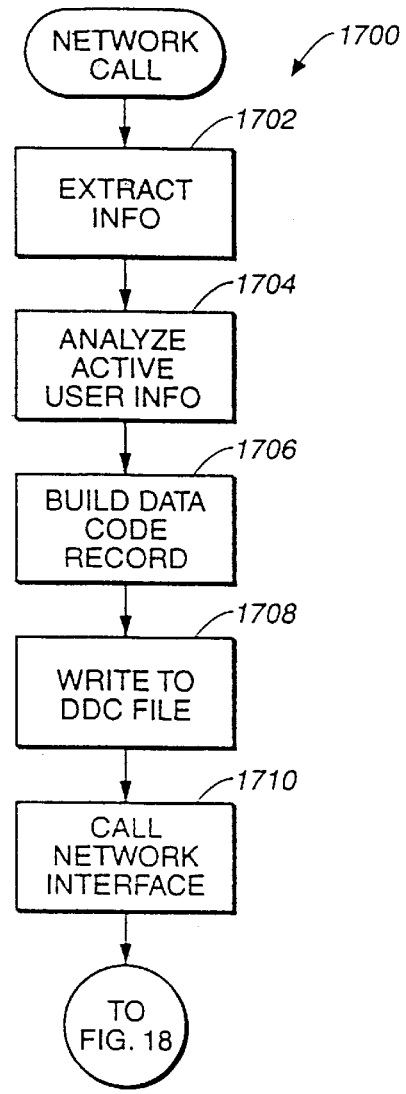
FIG._17
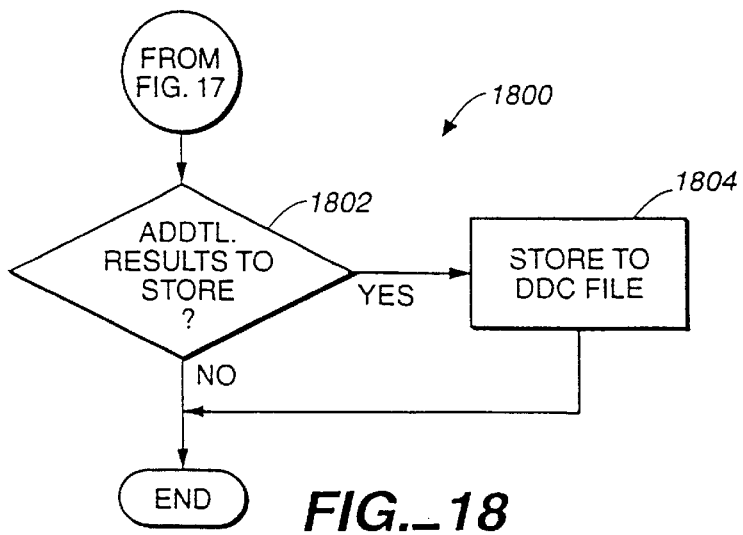
FIG._18

TIME AND WORK TRACKER WITH HARDWARE ABSTRACTION LAYER

The present invention is a continuation-in-part of patent application Ser. No. 08/987,908 filed Dec. 9, 1997, now U.S. Pat. No. 5,963,914 which is a continuation-in-part of patent application Ser. No. 08/732,675 filed Oct. 15, 1996, which is now U.S. Pat. No. 5,696,702, granted Dec. 9, 1997, which is a continuation-in-part of now-abandoned U.S. patent application No. 08/423,029, filed on Apr. 17, 1995. U.S. Pat. No. 5,696,702 and Application No. 08/987,908 now U.S. Pat. No. 5,963,914 are incorporated herewith and made a part of the present application.

TECHNICAL FIELD

The present invention relates generally to systems for recording time expended in performing tasks and, more particularly, to systems for automatically recording time and work performed on a computer by monitoring file activity and by monitoring various input devices.

BACKGROUND OF THE INVENTION

Telecommuting refers to work being done at locations other than a central location. Telecommuters are typically knowledge workers who work primarily on tasks which require mental or intellectual activity, rather than on tasks which require physical or capital intensive work at a central location. Many Telecommuters use personal computers at their remote work site. One of the biggest obstacles to implementation of telecommuting is that managers would not be able to tell if their telecommuting employees were actually working. Another obstacle is the problem of how to measure the productivity of telecommuting employees. A manager needs to trust that a telecommuting employee is working and trust is developed through quality communications between the central site and the remotely located telecommuting worker.

Professional knowledge workers, such as computer programmers, bill their time for work done on their computers. The problem of how to monitor their time and activities on their computer, as well as how to automatically calculate the cost of these activities for accounting purposes, needs to be solved. Many invoicing systems rely on the manual inputting of the billable time and a technique is required to determine the accuracy of that billed time. In the custom software programming business, specifications often change so that more time is expended than is originally projected and a customer needs to receive accurate documentation for additional time to be billed.

A Directive issued by President Clinton on Jul. 11, 1994 on family-friendly work arrangements addressed the subject of expanding family-friendly work arrangements in the executive branch of the U. S. Government. The head of each executive department or agency was directed to establish a program to encourage and support the expansion of flexible family-friendly work arrangements, including: job sharing; career part-time employment; alternative work schedules; telecommuting and satellite work locations. All necessary steps were to be taken to support and encourage the expanded implementation of flexible work arrangements to achieve the goals of the directive.

Telecommuting would have a significant impact on reduction of air pollution. AT&T has estimated that an average employee spends 70 minutes a day commuting and generates 43 pounds of pollution a day. If two million commuters, which is less than 3% of the United States work force, telecommuted, 43,000 tons of pollution would be eliminated every day. The California's Southern Coast Air Quality Management District estimated the annual pollution from cars in 1991 to be 2,064,000 tons of pollutants.

Telecommuting provides a number of benefits. Productivity increase of 10%–20% can be expected. Turnover rates and related new employee recruitment and training costs are reduced. Management by objective rather than management by process is fostered. Specialists for a particular task can be recruited, regardless of geographic location. Organizations can be flexibly organized with faster response times and improved employee morale. Telecommuters can provide greater participation by users in their local activities. A cleaner environment and an increased ability to meet state and federal clean air and employee commuting reduction programs can be provided. The consumption of energy and dependence on fossil fuels is decreased.

Several important business economic concerns are all positively affected by telecommuting, including: maintaining or increasing productivity; decreasing office space needs; attracting or retaining critical skills among the staff; and compliance with air quality or other environmental regulations.

U.S. Pat. No. 5,305,238 dated Apr. 19, 1994, granted to Starr et al. for "Data Input Monitor and Indicator For Managing Work Pace and Rest Periods" discloses a data input monitor for use with a computer keyboard, which measures the amount of data entered into a computer and establishes rest periods based on the measured data input. This patent counts keystrokes but does not provide an indication of what work is accomplished or what projects are being worked on.

U.S. Pat. No. 4,819,162 dated Apr. 4, 1989, granted to Webb et al. for "Time Clock System Including Scheduling Payroll and Productivity Analysis Capability" discloses a computerized time clock system, which includes a personal computer via which employee, job, and schedule records may be assembled and maintained. This system records only time-in and time-out transactions and does not provide for user-defined data collection and analysis of time expended and work accomplished.

Thus, a need exists for a technique for selectively and automatically measuring the actual amount of work done on various projects on a computer by an operator, such as a telecommuter, either at a local site or at a site on a network where the user has a number of input devices.

SUMMARY OF THE INVENTION

It is an object of a time tracking system provided according to the invention to produce automatic documentation and unalterable proof of work done on a computer. This will allow managers to feel more comfortable with having their computer-oriented employees telecommute, resulting in economic benefits to the employer, employee, and ecological benefits from reduced vehicle usage and car emissions due to commuting. Self-employed professionals who use a computer to generate income can use this product to document their work and automatically generate invoices that accurately documents the time and work done by the computer professional.

The time tracking system according to the invention has a data analyzer which provides for the exclusion of time where there is no activity on the computer. By accurately measuring the time and work on a computer, productivity can be measured and estimates for future projects can be more accurately forecasted with reduced financial risk. The time tracking system according to the invention provides the ability to track only certain user selected files or directories.

The time tracking system provided according to the invention provides for automatic documenting of time and work performed on a computer. In the past, the tracking of worked time has been done by manual input and not on stand alone personal computers. Anyone working with a personal computer or a computer network can have an automatic, accurate, and reliable means of documenting time and work done with a personal computer. The invention permits selection of the files and directories to be monitored. Multiple customers or employers can be accommodated and all operating system calls can be stored.

The time tracking system according to the invention provides an automatic way of collecting information about computer work, categorizing it by user-definable rules, and in essence, providing proof of exactly how long someone has been working on a specified task. This provides a documentation tool beneficial to both management and workers.

The time tracking system according to the invention provides a technique for selectively and automatically measuring the actual amount of work done on each of various projects on a computer by an operator such as a telecommuter.

The data collected by the system can be encrypted to maintain the integrity of the data. Because the data is encrypted, information about reported time and work performed on the computer is accurate and cannot be altered.

The system provided according to the invention automates the documenting of time and work performed on a computer. In the past, the tracking of worked time has been done by manual input and not on stand-alone personal computers. The purpose of this invention is to measure the amount of work done on a computer. The advantage is the amount of time and work performed out of sight can be accurately and automatically documented and encrypted to prevent manipulation of recorded data. Anyone working with a personal computer can have an automatic, accurate, and reliable means of documenting their time and work done with a personal computer. For those that work with personal computers, there is now a way of automatically documenting work performed. The system is able to select what file and directories to monitor, based on user selection. The system is also able to work with multiple customers or employers to automatically store all operating system calls.

In accordance with this and other objects of the invention, a technique is provided for measuring the amount of work done on a computer. The invention is a method and system for automatically collecting information about time and work performed on a computer and includes the following elements: data collector means for monitoring certain portions of a user's computer activity; data collector means for logging into a log file those certain portions of a user's computer activity; data analyzer means for determining, by means of user-defined rules, which portions of those certain portions of a user's computer activity constitutes work and how this work should be categorized by project and task with project; and external interface means for building the rules defining work. Work can be organized by customer, department, or any other sets and subsets.

The data collector means for monitoring certain portions of a user's computer activity includes a resident module or an operating system extension such as, for example, a TSR (terminate-and-stay-resident) module which extends the file system of the computer so that detailed records are kept of file activities. The data collector means for logging those certain portions of a user's computer activity includes an application which extends the user interface of the computer so that detailed records of user activities on external input devices, such as, for example, keyboard activity and mouse activity, are kept as a user performs work. The data collector means for logging those certain portions of a user's computer activity includes means for producing a log file which contains a chronological summary of the activities of a user. The data collector means for logging those certain portions of a user's computer activity includes means for producing the log file which contains non-automatically collected data, such as the user's comments on their work.

The data collector means for monitoring certain portions of a user's computer activity includes means for routing information about file activity to the data collection means and includes means for tabulating and writing such information to a user's disk periodically.

The system includes means for routing information about activity of various external input devices using a hardware abstraction layer which translates external activity to keyboard activity and mouse activity to the data collection means through means for filtering such activity. Using the hardware abstraction layer, the external input devices are not limited and includes voice recognition, telephone devices, remote sensors, and other known external user input devices. A filter takes information from one program, examines it, possibly changes the information, and then passes the (modified) information along to another program.

The data analyzer means includes a database and the log file captured by the data collection means. The database contains a description of which files, directories, programs, etc. on the hard disk define a task, where a task is a basic unit of work, where one or more tasks are collected in a group known as a project, and where a project defines information about the owner of the task(s), and also serves as an accumulator for all work performed.

The log file includes a series of chronologically ordered events including items selected from the group consisting of file activity such as opens, keystrokes, mouse clicks, user notes, etc., and wherein the data analyzer means include means for reading this data and sorting these activities depending upon the task descriptions.

Certain activities in the log file are categorized as belonging to a specific task. For certain tasks, a user can define certain time periods. When that certain time period has elapsed between activity, means are provided for totaling the time as a work period.

The data analyzer means includes means for updating the database with total information. The data analyzer means includes means for updating various internal data files. The data analyzer means includes means for certification of the collected data including cross-checking to detect tampering. The data analyzer means includes means for copying the log file and for creating a new empty log for further data collection.

The external interface means for building the rules defining work includes means for manually or automatically building the rules defining work. The external interface means for building the rules defining work includes means for exporting work-completed information to other, third-party, programs such as project managers, spreadsheets, etc. The external interface means for building the rules defining work includes means preparing printed reports, financial invoices, and summary information from the categorized work results. The external interface means includes a database and one or more data files, wherein the external interface means includes means for writing from the database to export data to other programs including databases, project managers, word processors, etc., and wherein the external interface means includes means for writing to the database to import data from other programs.

A method for automatically collecting information about time and work performed on a computer includes the steps of: differentiating between multiple types of external user input devices using a hardware abstraction layer of software between the external devices and a monitoring system; monitoring certain portions of a user's computer activity; logging into a log file those certain portions of a user's computer activity; determining, by means of user-defined rules, which portions of those certain portions of a user's computer activity constitutes work and how this work should be categorized by various sets and subsets, such as, for example, projects and tasks; and building the rules defining work.

The step of monitoring certain portions of a user's computer activity includes monitoring with a resident module or an operating system extension such as, for example, a TSR (terminate-and-stay-resident) module which extends the file method of the computer so that detailed records are kept of file activities including activities such as open, close, read, write, rename, etc. The step of logging those certain portions of a user's computer activity includes extending the computer's user interface so that detailed records of activity on external input devices, such as keyboard activity, mouse activity, etc. are kept as the user performs work.

The step of logging those certain portions of a user's computer activity includes providing the log file which contains a chronological summary of the user's activities. The step of logging those certain portions of a user's computer activity includes producing the log file which contains non-automatically collected data such as the user's comments on their work.

The step of monitoring certain portions of a user's computer activity includes the step of routing information about file activity to the data collection means and the steps of tabulating and writing such information to a user's disk periodically.

A system and method according to the invention includes, but is not limited to the following internet/intranet application areas: remote access, telecommuting employment; on-site employees documenting their time for payroll; accurate billing for computer-based independent professionals and consultants such as attorneys, accountants and computer consultants; determination of activity costs; estimation of time and amount billable for future projects/work; measurement of cost/benefit of new software or hardware; project management linking; accounting systems linking; tracking of activities and time used on a distributed basis; nano-business costing; resource management tool; assistance in social accounting; manufacturing systems; remote education to document study/activity time; objective tool for screening new hires; means for distributors to get into duplication, publication services and have authors trust activity count; and video conferencing consultations with automatic billing calculations.

A system according to the invention provides information about continuous activity, as determined by each segment of user activity on a particular project, or task, exceeding an idle time interval. This is in contrast to manual stop/start clock systems which start and stop a clock such that work activity is being registered even if no actual work is being performed. The invention allows a work period to lapse when there is no activity for a time greater than the idle time limit interval.

Note that in the present invention the idle time interval can be created at the time that a report is prepared. Depending on the type of activity being monitored, the idle time interval can be set to one minute or to fifteen minutes. In this sense, the system can provide project, or task, measurements after the fact, that is, when the reports are generated from the log file information. A system according to the invention allows rules to be defined ex post facto and the log file data to be analyzed in a manner that was not contemplated when the activities in the log file were initially recorded.

BRIEF DESCRIPTION OF THE DRAWINGS

The accompanying drawings which are incorporated in and form a part of this specification, illustrate embodiments of the invention and, together with the description, serve to explain the principles of the invention:

FIG. 1 is a block diagram of a system according to the invention for automatic documentation of work and time expended by a user of a computer, wherein the system includes a software module, called a hardware abstraction layer, for detecting activity of various user input devices.

FIG. 2 is a flow chart illustrating initialization of a data collection routine which is performed by a resident module or operating system extension such as a terminate-stay-resident (TSR) module which performs data collection logging file activity or logging keyboard and mouse activity for a computer system.

FIG. 3 is a flow chart illustrating a TSR Interrupt 9 routine for DOS Keyboard interrupt operation.

FIG. 4 is a flow chart illustrating a special TSR Interrupt 60 routine for a Window Interface interrupt operation.

FIG. 5 is a flow chart illustrating a special TSR Interrupt 21 routine for a file system hooking interrupt operation.

FIG. 6 is a flow chart illustrating a routine for a timer based interrupt operation in the data collection routine.

FIGS. 7A, 7B, and 7C illustrate a flow chart illustrating a routine for purging an event buffer to a log file in the timer based interrupt operation of FIG. 6.

FIG. 8 is a flow chart illustrating the main program for a Windows interface routine.

FIG. 9 is a flow chart illustrating a Windows interface for a DLL keyboard filter operation.

FIG. 10 is a flow chart illustrating a DLL Windows interface to a mouse filter operation.

FIG. 11 is a flow chart illustrating a DLL Windows interface to the TSR data collection routine for the keyboard filter operation of FIG. 9 and the mouse filter operation of FIG. 10.

FIG. 12 is a flow chart illustrating an activity data analyzer routine for a system according to the invention.

FIG. 13 is a flow chart illustrating a routine for checking active times in the analyzer routine of FIG. 12.

FIG. 14 is an illustrative timing diagram illustrating starting, restarting, and ending of an analyzer timer for a task, according to the invention.

FIGS. 15A and 15B are illustrative timing diagrams for two tasks illustrating operation of respective analyzer timers.

FIG. 16 is a flow chart illustrating initialization of a data collection routine which is performed by a resident module or operating system extension such as a terminate-stayresident (TSR) module which performs data collection logging file activity or logging keyboard and mouse activity for a computer system, which includes a DOS and a NOS.

FIG. 17 is a flow chart illustrating a call to an external provider.

FIG. 18 is a flow chart illustrating a routine for additional results to be stored for operation.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

FIG. 1 illustrates a data collection and analysis system 100 for automatic analysis and documentation of work and time expended by a user of a computer according to the invention. The system is called Dragnet. The Dragnet system operates with a computer such as a personal computer using, for example, a DOS operating system running DOS application programs or a DOS operating system with a Microsoft Windows graphical user interface for running Microsoft Windows applications. Other operating system platforms can be used, as desired.

The system 100 includes a main program that gives a user a database type of interface for building up project information and task information. The main program is, for example, a Visual Basic application that provides a database for keeping the data that the work analyzer needs and that provides a simple interface for selection of work analysis criteria and for printing of reports. An important part of the system 100 is a data collector that collects the data and a work analyzer that analyzes that data that interfaces to the main program.

The system 100 uses a software module which is a hardware abstraction layer 101, which is located between the system 100 and external devices. The system 100 has a number of input paths 101a, 101b, 101c for receiving input information from the hardware abstraction layer 101. The system 100 also has an input/output path 101d for receiving/sending information between the hardware abstraction layer 101 and the system 100. The system 101 is designed to usually interface with a user keyboard 102 for both DOS and for Windows applications. For Windows applications, the system 100 also interfaces with a mouse 104. A hard disk 106 is provided for storage of a user's applications as well as for storage of the various data files provided by the system according to the invention. The data collection part of the system works with either DOS or Windows applications, while the actual data analysis part of the system works only with Windows.

The hardware abstraction layer 101 allows a wide variety of storage devices and user input devices to operate with the system 100. The hardware abstraction layer 101 translates the activities of storage devices, typically shown as 107, so that they can use the storage path 101d. The hardware abstraction layer 101 translates selected activities of external selection devices, typically shown as 108, such as remote controls or devices connected by phone lines, so that they can use the DOS or Windows keyboard input paths 101c, 101b. The hardware abstraction layer 101d translates pointer device activities of pointer devices, typically shown as 109, such as a mouse or a drawing tablet, so that they can use the Windows mouse input path 101a.

The hardware abstraction layer 101 is equivalent to the BIOS in a PC computer. The system 100 monitors keyboard and mouse functions. The addition of the hardware abstraction layer 101 provides the capability of monitoring, i.e., detecting, activities of multiple types of input devices, such as remote controls for TV set top boxes, drawing, tablets, touch-tone keyboards, etc. The hardware abstraction layer 101 allows these and other devices to be detected directly by the system 100. This enhances the ability of the system 100 to categorize a number of additional activities, making the activities finer-grained and providing better accumulation of various different activities. Additionally, the hardware abstraction layer 101 makes it possible to add capability to the system 100 by providing "in the field" additions to the hardware abstraction layer 101 by downloading information for new external devices to the ROM of the system 100. The hardware abstraction layer 101 can be thought of as being similar to a plug-in module that allows one or more new activity detectors to be inserted without affecting the remainder of the system 100, as described herein below. In this manner, detection of activity of a new input device is provided without replacing or modification of the system 100, that is, without having to rewrite the core programs of the system 100.

The system 100 includes two unique software modules. The first module is resident module 110 or operating system extension such as a terminate-stay-resident (TSR) Dragnet module 110, which includes data collection and analysis functions, which are described herein below. While described in connection with a Windows or DOS environment, the resident module or operating system extension is intended to include implementations of the invention for systems other than IBM compatible systems. The second module is a Dragnet keyboard/mouse filter module 112. The system 100 operates in conjunction with operation of a DOS application program 114 or a Windows application program 116. A DOS file system 118 is used. For a Windows application program 116, a Windows graphic user interface 120 is provided.

As part of the startup for the DOS operating system, the TSR program 110 is started. The TSR program 110 hooks itself up between the DOS file system 118 and either a DOS application 114 or a Windows application program 116. A TSR (terminate-and-stay) resident program enables a program to embed itself into the computer's memory and to remain there while DOS continues to run other programs.

In the DOS mode of operation for a DOS application program, when the DOS application program makes a request to open a file or to run a program, the request first goes through the TSR program 110 before it goes to the DOS file system 118. When a DOS application makes a request for an operation to be performed such as, for example, a request to open a file, close a file, read data, write data, or change directories, the TSR program 110 passes that request onto the DOS system and lets the DOS system process the request. Before going back to the DOS application to give the DOS application the results, if the operation was successful, then that information is recorded by the TSR program 110. For example, if a file is tried to be open and the file does in fact open, that event is recorded. The information is recorded into a buffer memory. A separate asynchronous routine operates at one second intervals to take the buffer information into memory and to write that information out to a file on the hard disk. Because the TSR program 110 is hooked into the DOS system at a low memory address level, the TSR program cannot open files or do read/write operations with a file while data is being collected. Those other operations are done separately when the DOS system is not doing anything else.

In a similar manner, the TSR program 110 watches every key stroke that comes in from the keyboard 102. A keystroke comes into the TSR program 110 application so that it is possible to detect that a user is pressing keys. The only information that is necessary to know is that keyboard activity is happening. It is not necessary to know what particular keys are being operated. The actual keys are not recorded. What is recorded is the fact that, during a one-second interval, a user typed something into the keyboard. The TSR program 110 is placed between the DOS application and the DOS file system to monitor the occurrence of key strokes and to send keystroke occurrence information out to the hard disk every second.

In the Windows mode of operation for a Windows application program, the Windows system installs its own Windows keyboard driver and its own mouse driver. As a result, the hook routine that is installed to catch keystrokes at the DOS level doesn't get called when Windows is running. The Windows keyboard driver and mouse driver replace other service routines with their own service routines.

In order to monitor key strokes in the Windows mode of operation, the keyboard/mouse filter 112 is used. In general, a filter takes information from one program, examines it, possibly changes the information, and then passes the (modified) information along to another program. The keyboard/mouse filter 112 watches each keystroke and mouse click that happens while Windows is running. Similar to DOS monitoring keystrokes, the keyboard/mouse filter 112 also keeps track of the fact that a keyboard or mouse activity is happening. The keyboard/mouse filter 112 under Windows also keeps track-of which file is actually being used. For example, programs like Microsoft Word or Excel can have multiple documents open. It is necessary to know which files inside Microsoft Word are actually being manipulated. Using this keyboard/mouse filter 112, each time that there is a keystroke or a mouse click, the system 100 actually looks at which window in the top window on the screen and records that information. Using Windows requires a two-step process because of the architecture of Windows. If a Macintosh platform is used, only one step is required.

In Windows, the user types his keys and the keystrokes first go into Windows and then Windows decides which applications should get those key strokes. For Windows, the invention catches the keystrokes half way between Windows graphic environment module 120 and the Windows application 116. The Windows graphic environment module 120 looks to see which data file the Windows application is working with before passing the keystrokes onto the Windows application.

The Windows graphic environment module 120 includes the Windows keyboard and mouse drivers, the Windowing system, and everything else that makes up Windows as the operating system. The Windows application 116 sits on top of the Windows operating system and puts data into a screen window in response to user operations, such as menu selections. The Windows graphic environment module 120 functions to display screen windows and takes keystrokes and sends them to the Windows application 116. It's actually up to the application to decide that when you type "A," it should put a character on the screen. The invention catches the input keystroke information after the Windows graphic environment module 120 gets a character and decides which screen window the character goes to. The actual Windows application then gets the character. The Windows application 116 sends file activity information over to the TSR module 110.

Windows applications do not replace the DOS file system when they are running. Windows is actually built on top of the DOS application. When a Windows application opens a file, it still goes through the TSR module 110. When a Windows user types a key, the keystroke information first goes through the Windows graphic environment module 120. The remaining operations with Windows are similar to the DOS operations. The keystrokes also still have to go through the TSR program to the DOS file system 118. Under a DOS application, the information (both the keystrokes and the file information) come directly to the TSR module 110. Under Windows, the file information goes to the TSR module 110 directly from the Windows application 116, but the keyboard and mouse information to the TSR module 110 come from the Windows graphic environment module 120, and not directly from the keyboard.

FIG. 2 is a flow chart illustrating initialization of the TSR module 110, where the TSR module 110 performs data collection by logging file activity or by logging keyboard and mouse activity for a computer system.

Block 202 indicates initialization of a third party product called Coderunner which provides a very compact run-time library for the C programming language. The library subroutines from the compiler writers for a C program are used to open and close files and to print text on the screen, etc.

Block 204 indicates that parameters are loaded into a file from a parameter file 206. The parameters basically indicate if there are any files or directories that are not to be tracked. For example, a user might not want to keep track of an activity in a temporary directory or every time someone wants to open a font on a Windows directory. To avoid collection of voluminous and meaningless activities, a user can exclude such activities.

Block 208 indicates that the old DOS interrupt vectors are saved. Block 210 indicates that new interrupt vectors are stored in low memory. When a DOS application program wants to invoke a DOS routine, the Intel processor has a software interrupt feature so when the DOS application wants to invoke the DOS routine, DOS loads up some registers and generates an INT 21 command, which goes down to low memory and finds the address where the DOS routine is located and then jumps off to the DOS routine. The contents of that low memory location are saved. Hooking the interrupt means replacing the address of where the function is with the interrupt routine address and then calling the function.

In FIG. 2, the initialization proceeds from top to bottom without stopping and without going to any of the interrupt vectors. When it says store new interrupt vectors, it just means you're storing the addresses of these flow charts discussed in connection with FIGS. 3, 4, and 5, discussed herein below. FIG. 2. only shows initialization of the system.

Block 212 initializes a time-based scheduler routine, which is part of the Coderunner library. The time-based scheduler routine calls however often you want. It is initialized and Block 214 indicates that it is set for a one-second interrupt.

FIG. 3 is a flow chart 300 illustrating a TSR Interrupt 9 routine for DOS Keyboard interrupt operation for keyboard activity. Block 302 indicates that, when the low-level keyboard driver has a character, it generates an Interrupt 9 which is intended to go to DOS to eventually transmit that key onto the application. So we get the interrupt from the keyboard driver and set a flag saying we see a keystroke and then we call the DOS sub-routines which were supposed to get it in the first place.

Block 304 test flags to determine whether the Dragnet system is ready -and whether the Dragnet system is on in order to make sure that we don't start trying to collect data through the file system interrupt before we actually have all the buffers and other items ready. When the actual work is analyzed, no data is collected and the Dragnet is off. Dragnet is turned off so we are not trying to collect data about analyzing the work because that doesn't make any sense; there's nothing there to be collected. The ready flag says that everything is set up. If Dragnet's ready and on, the Block 308 determines whether a keystroke was stored since the last interrupt. If a keystroke was stored, the routine exits. Each keystroke is not stored because users can type a number of characters per second.

Block 310 indicates that, if a keystroke has not been recorded since the last interrupt, the keystroke record in a collection buffer is stored. There is an end memory collection buffer where, when different kinds of activity happen, we put data records in this collection buffer. Every second we get a different kind of interrupt that comes in and takes however many records are in the buffer and writes them out to the disk.

The interrupt routine for the keyboard of FIG. 3 only gets called when a user actually types a key. That's where it will go after we've done the boxes marked Store New Interrupt Vectors.

FIG. 4 is a flow chart 400 illustrating a special, arbitrarily-named TSR Interrupt 60 routine for a Windows Interface interrupt operation. This routine is unique to a system according to the invention and is not something that the DOS operating system already provides. The TSR Interrupt 60 routine provides a 110 mechanism so that the Dragnet keyboard/mouse filter module 112 can communicate with the TSR module 110 in order to put data into that same buffer that gets written out to the disk once every second. Blocks 402 and 404 indicate whether Dragnet is ready and on.

When the Window keyboard/mouse filter 122 wants to store some information, it puts a code value in the register and does an Interrupt 60. The code values are 1, 2, or 3, which indicates three different operations: Code 1 asks the TSR where the buffer is; Code 2 tells the TSR to change the address of the pointer within the buffer; and Code 3 provides a Windows Busy mechanism to make sure that the DOS TSR operation and the Windows collection do not happen simultaneously.

Block 406 tests whether a Code 1 is present. If so, Block 408 shows that the address of the buffer pointer is returned. If not, Block 410 tests whether a Code 2 is present. If so, Block 412 updates the buffer pointer for the register. If not, Block 414 tests whether Code 3 is present. If so, Block 416 sets or clears the Windows busy Flag. This ensures that, while the buffer is being filled up, a protection mechanism is provided to make sure that, while a user is putting data in the mouse keyboard filter, the one-second interrupt handler isn't trying to write the buffer contents out to the disk. This routine is called once to 'set the flag' and then it is called again to flag when the user is done. In that way, if a one-second interrupt comes in when the system is in the middle of processing a mouse click from Windows, the system will wait for the next second.

FIG. 5 is a flow chart 500 illustrating a special TSR Interrupt 21 (INT 21) routine for a file system hooking interrupt operation. An interrupt 21 is a DOS function which controls how DOS applications open files, close files. Interrupt 21 is written in Assembler code and is a true interrupt handler. The Block 502 saves the values in the registers of the processor. The Blocks 504, 506 determine whether Dragnet is ready and on.

If so, the Block 508 determines whether a TYPE is interesting. When you do an INT 21 you pass into a register one of about 60 different codes that says what you want to do. Do you want to open a file, close a file, rename a file, etc. Those are the codes or types. We don't monitor every single type; actually we monitor about 7 or 8 different types.

We look to see if a type is something that we want; mainly if is it something that has a file name associated with it. And if it is, then we save what kind of type it is and we save the string in Block 510 (normally the file name that was associated with it). Then we go call the old INT 21 in Block 512 because we have to go to DOS and actually have DOS do the work, try to open the file, for example. Then we come back and look at the processor's carry flag in Block 514, which is one of the processor's internal registers. If it is set that means that is the way DOS indicates that there was an error. If there was an error, we back up this pointer in Block 516 where we save the record type and string because it didn't actually work.

In other words, a typical way with a DOS system is that you have this PATH statement that specifies where the files are and it goes down through the path and tries to open each file and each directory on the path until it finds it. It is not interesting to us if it had to go through 5 different directories before it found the file. We only care when it actually found it. So if you wrote an application that just simply tried over and over and over in a loop to open files that didn't exist, we wouldn't consider that work. You are not accomplishing anything; therefore, it is not recorded as work.

FIG. 6 is a flow chart illustrating a routine for a timer-based interrupt operation in the data collection routine. Block 602 asks if DOS is busy and if DOS is busy, then Block 604 causes another one second delay. We set up the timer to interrupt us in another second and then we leave. If DOS isn't busy, Block 608 indicates that the data that was collected by the TSR is written to a disk, which is the purge event buffer file.

Block 610 indicates that the pointers are checked for initialization. If not, Block 612 sets up pointers with the values of the current data segment registers in the Intel processor. The first time that this flow chart is executed it is necessary to initialize some things because one of the segment registers inside the Intel processor changes between initialization time and actual execution time of the subroutine. That process is done once and in Block 614 flags are reset that say we have seen a keystroke. In Block 618 a flag is set that says the pointers are ready so that the next time we come through we will take that yes path out of Block 610. Block 620 indicates that in a second later we go back to start.

FIGS. 7A, 7B, and 7C illustrate a flow chart 700 for purging an event buffer to a log file in the timer based interrupt operation of FIG. 6. In Block 702 the Windows Busy flag is tested. If Windows is not busy, Block 704 decrements the Windows Busy flag. If the Windows mouse filter is doing something, then Windows is busy and we have to wait until the next second. Windows is busy means that our portion of our system that runs on Windows is busy, not the Windows operating system. If we can, then we decrement this flag which tells Windows that we're busy so it doesn't try to do anything while we're doing this. Block 706 test if anything is in the buffer. If not, Block 708 increments the Windows busy flag and we leave. If there is something in the buffer, Block 710 indicates that the Dragnet_On flag is set to 0, or turned off in order to prevent our INT 21's from being recorded. As we are trying to write this data to the file, we are going to be issuing INT 21's and we don't want our INT 21's to be recorded. Block 712 indicates that we open the activity log file 714 on the hard disk 106. The activity log file 714 is structured for convenience as one file for each month. The current date and time are determined and the appropriate monthly activity log file 714 is opened. The routine continues as indicated by the Purge 2 continuation symbol 716 to FIG. 7B.

In FIG. 7B, Block 720 tests whether the activity log file 714 opened. If not the routine continues, as indicated by the Purge 3 continuation symbol 722 to FIG. 7C. The file not being open means that some error is happening, but the system is not going to crash and the routine continues on. Block 724 indicates that we go to the end of the activity log file 714 because we are appending data to the end of the activity log file 714.

Block 726 is the start of a loop which fetches and writes activity records to a data collector. Block 726 fetches a new activity by RecType and Data. RecType indicates the type of activity such as a file opening or closing, a keystroke, etc.

Data is typically the name of the file or a path when a change directory operation happens.

The loop proceeds to Block 728 which tests whether a file name which consists, for example, of 8 tildes and 3 back quotes is open. The file name is not a normal file name. If an attempt has been made to open that file, Block 730 indicates that the parameter file 206 of FIG. 2 is to be re-read. This allows changes to be made and to be read from the parameter file without having to re-boot the computer. After the parameter file is re-read, the data not actually recorded to the disk. If Block 728 does not detect the file name which causes the parameter file to be re-read, Block 732 tests whether another special file name, which is called DRAGNET ~.OFF is active. This file is activated as a way of turning Dragnet off. Code for a subsequently described work analyzer code can try to turn the Dragnet system off. And if in fact that is the case, then the Dragnet system is turned off by means of Block 734 which sets a turnOff variable to a one state. If Block 728 or Block 732 indicate that neither one of the two special file names has been opened or attempted to be opened, then Block 736 indicates that the activity data is to be written to a Dynamic Data Collection (DDC), or Dragnet Data Collection. The DDC is the same as the activity log file 714 with a different name.

Block 738 tests whether more data is in the buffer. If so, the routine loops back to Block 726 to fetch more data. Data is collected for one second. In one second, the computer could have opened and closed a number of files, received three keystrokes, and done a number of other functions so there will be a number of different records in the buffer. The loop starting with Block 726 and ending with Block 738 keeps operating until the buffer is empty.

If Block 738 finds that the buffer is empty, the routine goes through the Purge 4 continuation symbol to Block 740 of FIG. 7C, which closes the activity file. Block 742 indicates that the buffer pointers are then reset and all of the data collected is lost.

With reference to FIG. 6, Block 608 is implemented in FIGS. 7A, 7B, and 7C to purge the event buffer once a second to the activity log file. Blocks 610, 614, 618, and 620 check if the pointers are initialized, reset the flags, and wait for another one second. The TSR module gets interrupted every one second according to the routine of FIG. 6. The TSR module is also asynchronously interrupted using the interrupt routine of FIGS. 3, 4, and 5 for INT 9, INT 21, and the special INT 60. These synchronous and asynchronous interrupt routines get information to the TSR module.

FIG. 8 is a flow chart illustrating the main Windows interface program 800 which implements the system of FIG. 1. The Dragnet keyboard/mouse filter 112 has two parts. It has the main Windows interface program 800 and 25 something called dynamic link library (DLL) programs which are methods of implementing programs under Windows. The main Windows interface program 800 initializes everything. The dynamic link library (DLL) programs actually gets called in a similar kind of way when each keystroke gets hit inside Windows.

The Dragnet keyboard/mouse filter 112 works as follows: When the system, or program, according to the invention is installed for Windows, an icon for this program is put into the Windows start-up folder. When Windows starts, it automatically runs the program. This is the Drag hook indicated as 35 element 802 in FIG. 8. This is similar to the TSR 110 of FIG. 1 for DOS, which is started when DOS is booted. The Windows interface of FIG. 8 is started when Windows is started.

Block 804 initializes the program. Block 806 installs the keyboard filter, Block 808 installs the mouse filter, and Block 810 displays a message. Block 812 indicates that the program then loops forever. The forever loop of Block 812 means that the program just sits there and loops forever because in the process of installing the keyboard and mouse filters the extra separate subroutine library called a DLL is loaded. If the program quits, the DLL would not. If the DLL would get removed from memory, the whole system would crash. The program is a Windows program with no screen window in which the user never sees it as a window on the screen.

FIG. 9 is a flow chart illustrating a dynamic link library (DLL) routine 900 for a Windows interface for a DLL keyboard filter operation. The DLL is a Dynamic Link Library which is a way of having sub-routine libraries that get loaded when they're needed and can be shared between different applications. A DLL also is a way inside Windows that allows certain things to be done because of certain Intel addressing conventions.

Every time a user presses a key, we get called before the application that's looking for the key gets called in the same way as a DOS interrupt but not as an interrupt. When the keyboard filter 900 is invoked at point 902, Block 904 saves the title of the last window that was looked at. This is similar to what was done with the DOS version of the present invention. If a user types a hundred keys on the same screen window, a hundred messages are not written to the activity log file. An activity log file is written under Windows only every ten seconds. The conditions for writing something to the log file from a Windows application has to be a key in a new window, or it's been ten seconds since the last key.

Block 904 saves the last Window title, we get window text as a Windows call. Block 906 gets the title of the current window and Block 908 tests whether the current window contains a valid file name to determine activity by a user. If the file name is not valid, then Block 910 calls EnumChildWindow, which is a window call which sorts through a number of screen windows on top of each other window until it finds the screen window that has the file name that is actually being used. This is done because in Windows again, when you have a multiple document application, you can either have a frame window and smaller windows inside, or you can actually blow up the inside windows so that you still only see one document at a time but you still have multiple documents open. When you do that, it puts the name of the file in the outside window. The active file name is looked for in the outside window. If it is found, we are in the particular case where the inside windows are maximized. If the name is not found, then we have to go down and search down through the "children" windows until we find which particular window we are currently working with.

After the window is found with a valid file name in it, Block 912 determines if conditions are right. The conditions are: a key down, more than ten seconds since the last key, or a different window since the last interval. If all the conditions are true, Block 914 stores a string using the INT 60 routine, as described herein below. Block 918 calls the next hook which means that we call the next person in the chain here to effectively process the keystroke. In Windows there could be multiples of these keyboard filters and we can get called after some have been processed and before all of them have been processed so we come in and do our work and pass it on to the next guy which may be the application, or it may not be; we don't care.

FIG. 10 is a flow chart illustrating a DLL Windows interface to a mouse filter operation which works exactly like the keyboard filter. We get the mouse click, we go find the title of the current window in Block 1008, and decide whether it has a file number in it or whether we have to go searching for it and then we look for the conditions and the conditions are similar. It has to be a 30 mouse down and either more than ten seconds, or in a different window. And if it meets those conditions, then we write the information off to the TSR buffer saying something happened. And then we call the next animal in the food chain in Block 1016 to do whatever with this mouse click that needs to be done.

FIG. 11 is a flow chart illustrating a DLL Windows interface to the TSR data collection routine for the keyboard filter operation of FIG. 9 and the mouse filter operation of FIG. 10. This is the way in which we use the interrupt 60 to communicate. Block 1102 is called by Block 914 of FIG. 9. Block 1104 calls the TSR to tell it to do the Get /Set Windows Busy flag routine. Block 1106 looks to see if the TSR is present in memory. If it isn't present in memory, the program exits. If the TSR routine is not started, we don't want windows to crash simply because it's not there. So there is some error protection to make sure that Windows isn't crashing. If the TSR is present, then Block 1108 looks to see whether we got the Windows Busy flag. Block 1110 provides a one second delay because if we were in that routine that we went through before where we were doing the purge event buffer routine, then we can't get it so we have to wait for a second and try again. This provides a synchronization mechanism between these two parts of the program to make sure that both people aren't trying to write into the buffer at the same time. So assuming that when we finally get done with this, and we get the flag (the windows busy flag), then Block 1112 indicates that we go call the TSR to get the address of where does the next record go into memory buffer. Because we're running in Windows, Block 1114 converts that real memory address to a virtual memory address because that is what Windows applications are expecting, virtual memory addresses. Then just like in INT 21, for example, Block 1116 indicates that we do a store RecType and String routine which means that we store whether it's a keystroke or a mouse click and we store whether it's a name of the file on top of that window. Block 1118 indicates a TSR Update which is a third call inside the TSR that says move the pointer in the buffer just past the end of the record just entered. This is done so that the next piece of information to go into the buffer will be stored at the proper place because what was done was to get the buffer point and put the data in and how much data was put in. Block 1120 indicates that the Windows Busy flag is cleared and that the TSR can use the buffer again.

FIG. 12 is a flow chart illustrating an activity data analyzer routine 1200 for a system according to the invention. Once we get everything loaded serially into the activity log file, analysis can be done either locally or remotely. With regard to time and this system, one way to think about this is to divide your work up into various tasks and for each task have a stop watch. But for this type of stop watch, unlike a regular stop watch, you have to keep pressing the button to keep it going and if you don't press the button after a while, it will stop. These are the active times used for this invention. All the stop watches are initialized to zero. Cumulative time file are used to store the amount of time already spent. These files are updated to cumulatively track work. Block 1202 initializes the times to zero. Block 1204 loads current cumulative times from a cumulative time file 1206.

Block 1208 gets the next activity and determines which tasks belong to that particular activity.

Block 1210 determines the owner of a particular activity. This means that if you set up so that everything inside the Jones folder belongs to Jones and everything inside the Smith folder belongs to Smith, we go read something from the activity file that says I opened up the A.B file inside the Jones folder, then the owner logic will use that information which says that everything inside the Jones folder belongs to the Jones task to determine that the owner of that particular activity is Jones.

Block 1212 checks if a job or activity is not to be counted. Not every activity that the system might do belongs to a particular task. There are activities that don't belong anywhere, for example, when the operating system reads and writes its own file. The act of opening that font file does not necessarily belong to an activity because the act of opening the font file belongs to the operating system. In an operating system such as Windows, for example, the font file will get opened once for an application like Microsoft Word, even if multiple documents are using the font. The activity of opening the font in this particular example does not belong to a particular owner, it belongs to Word. In this case, for example, this result equals No_Job?.

If there is NoJob, Block 1214 checks the active time. The stop watches do not automatically shut off. The system has to periodically look to see if they have been running too long without any activity and shut them off if the result wasn't equal to NoJob. If the result was equal to a particular job, then Block 1216 accumulates the time for that particular job. This is analogous to actors who spin plates on top of sticks. If you get some activity for user Jones, the system gives the Jones stick a little spin to keep the plate going. But if there is no continuing activity on Jones, eventually the plate will fall off the stick. Each activity is looked at to see who it belongs to and if it belongs to a certain person, then we simply give their plate another spin.

For the concept of the determined owner, what the Visual Basic application does is to provide an interface with a database where a user specifies what the names of his tasks are, like Jones and Smith. Then, what is specified is how you determine whether an activity belongs to Jones or belongs to Smith. This is implemented using string matching based upon the file names. In other words, every activity inside the Jones directory on a certain disk drive belongs to Jones. Every activity that has the word "Smith" in it, belongs to Smith no matter where it is. A variety of different criteria can be specified, using OR logic. An activity is classified if it matches a criterion that belongs to that particular task. Particular things can be excluded. Temporary files, backup files, or other things not to be tracked can be excluded in this way. For example, tracking of certain kinds of program applications like Microsoft Word and Excel but not Solitaire can be done. Two owners can both get credited for the same activity. If Smith is a graphic design project, you might watch for use of Fractal Design Painter application and credit that use to Smith. Two tasks can share the same activity.

FIG. 13. is a flow chart illustrating a routine 1300 for checking active times in Block 1214 in the analyzer routine of FIG. 12, which is the logic for keeping the "plates spinning". Block 1302 starts a timing loop for each job. Block 1304 calculates the difference in time between activities. Block 1306 tests if the allowable idle time is exceeded to stop that stop watch. If not, the routine 30 loops back to Block 1302 for another job. If the idle time is exceeded, Block 1308 accumulates the job time. If it's time to stop that stop watch, then we accumulate the total time in Block 1310 and go back to do the next job. If it's not time to stop the stop watch, we go on to the next task. All tasks are looked at to determine if there's any activity. If any files are updated, Block 1312 writes the data out to the file.

An event analyzer module reads the activity log file over a particular range of days. Another module called a reports module provides an external interface to the system according to the invention. Data can be imported from other programs and project manager. Exports can be made to database project managers, etc. to provide printed reports, invoices and summary information.

The event analyzer for the time tracking system is described in the following pseudo code to function as follows:

1. For each job or task, there are four times:
  a. total time (all time since last reset/billing)
  b. current time (all time since last job start)
  c. active time (time of last event)
  d. idle time (timeout for end of job)

Total and Current time are 0 relative (i.e. they represent total hours/minutes/seconds). Active time is real-time and is used to compare with event times to determine if a job has exceeded it's idle time limit.

2. Analyzer loop:

```
Load all total times from file
Zero all current times
again:   get next event
  determine which job this event belongs to...
  If it is NO_JOB then it is 'system' event
  which we can use to check active times
  so we CheckActiveTimes()
  otherwise
  if (old event time!=0)
  currentTime[job]+=this event time - old event time
  set activeTime[job]=this event time
```

-continued

```
CheckActiveTimes() for all other jobs to determine if idle
goto again
```

3. CheckActiveTimes()

```
for(i=1 to # of jobs)
  if this event time - old event time [i]>idle[i]
  job is idle
  if old event time[i] !=0
    currentTime[i]= old event time+ idle[i]
  total time[i] +=currentTime[i]
  if any totals updated then
  Write totalTime file
  Write a record to the job worked file
  Write a record to the cumulative job file for this job
```

FIG. 14 is an illustrative timing diagram illustrating starting, restarting, and ending of an analyzer timer for a task, according to the invention.

An explanation of how a work computation data analyzer is as follows: For each task we keep what in electronic terms is called a "re-triggerable one-shot" monostable timer. This means that the timer can be reset from its current position to the maximum position at any time. It only expires if nothing has retriggered before the timeout value.

A waveform for such a timer is shown in FIG. 14:
At time a, the timer is started.
At time b, the first timer expires.
At time c, the timer is started.
At time d, the timer is re-started.
At time e, the timer expires.

FIGS. 15A and 15B are illustrative timing diagrams for two tasks illustrating operation of respective analyzer timers.

If one imagines each "start" as the detection of activity for a certain task then each re-start is another detection of activity for that same task. Only when the timer "expires" does the work analyzer decide that work has been performed. That is when the time between the last event for this task and the current event for this task is greater than the idle time.

In the work analyzer one of these "timers" is created for each task in the user's database. When an activity is seen, the activity starts and restarts the timer. At the end of the analyzed time all the timers are assumed to have expired. A waveform form is shown in FIGS. 15A-B with a user working on two tasks:
At time f, start task 1.
At time g, end task 1.
At time h, start task 2.
At time i, end task 2.
At time j, start task 1 again.
At time k, restart task 1.
At time 1, start task 2 again.
At time m, restart task 2.
At time n, end task 1.
At time o, end task 2.
And so forth.

The print module will contain an analyzer that attempts to correlate all information in the totalTime file, the job worked file and the cumulative job file before printing. If any of the totals don't match the report will not be printed.

In the event that the totalTime file or the cumulative job file is missing, the report can be printed but will contain a caption indicating that it is not a validated report.

Also the size and checksum for the first and last blocks of the job worked file will be calculated each time the file is opened or closed and if they don't match an entry will be written to the file indicating tampering has occurred.

A system and method according to the invention includes, but is not limited to, the following application areas: remote telecommuting employment; determination of activity costs; estimation of time and amount billable for future projects/work; measurement of cost/benefit of new software or hardware; project management linking; accounting systems linking; tracking of activities and time used on a distributed basis; nano-business 15 costing; resource management tool; assistance in social accounting; manufacturing systems; remote education to document study/activity time; objective tool for screening new hires; means for distributors to get into duplication, publication services and have authors trust activity count; and video conferencing consultations with automatic billing calculations.

For remote telecommuting employment applications, managers and clients can know when the employees or consultants are working and can measure productivity resulting in energy savings and improved air quality caused by reductions in miles driven in polluting vehicles.

For determining activity costs such as, for example, the cost of financial reporting, accounting reconciliation, computer file maintenance, etc., linkups to accounting software provide financial statements showing monthly/YTD costs by activity.

For estimating time and amounts billable for future projects/work, a system according to the invention provides data to be exported and used in an estimating algorithm or used in statistical analysis to estimate at, for example, an 80% probability using statistical functions found with spreadsheet programs.

For measuring cost/benefit of new software or hardware, the system provides data for activity-based costing of activities and for determining benefits of new processes or products.

For project management linking, the system can automatically feed recorded actuals into project software. For accounting systems linking, data entry of timecards information can be eliminated.

For tracking of activities and time used on a distributed basis, instead of a centralized timer of services provided by mainframes, cable TV, etc., activities and time used are tracked on a distributed basis. A user knows what he is going to be charged for services when the user is hooked up to a computer. Current mainframe time tracking software tracks CPU time at one rate and does not accumulate charges based on directory/file criteria. The invention can be used in smart houses or in allocating mainframe charges to departments.

For nano-business costing applications with a multi-tasking operating system on a desktop computer and the system's ability to accumulate activities and costs in separate budgets, a computer user can simultaneously perform various types of business functions on a desktop computer and automatically have the activities documented and costs accumulated in the chosen business function, such as marketing, production, accounting, etc.

As a resource management tool, the invention helps measure time and costs of various methods of getting a job done. The system helps to objectively determine the time, cost, and resources needed to perform a task, using a computer. Given the information, a manager has useful information to determine how to allocate resources to accomplish multiple simultaneous tasks among a department or company.

To assist in social accounting, the system helps to determine what it costs to implement a government program. A system helps to determine not just the funds that are distributed to the beneficiaries, but also the staff and material costs for managing the program.

For manufacturing systems, this system with remote sensors, such as RF ID devices, is used to document production and to assign costs.

For remote education, the system is used to document study or activity time. A tutor or teacher can review a student's approach and logic in solving a problem and can address any errors. The system facilitates multimedia programming training on demand with feedback on students approach to solving assigned programming exercises.

The system is useful as an objective tool for screening new hires and for performance-based assessment testing. Managers can screen candidates for a computer oriented job by assigning a task. The system will document time and activities but does not measure quality. The system provide valuable information for a manager to make an objective hiring decision in filling the job vacancy.

Installation of the system on disk duplicating machines would allow distributors to get into duplication or publication services and have the authors trust the counts of the distributors to verify that royalty payments have included all of the distributors sales.

The system facilitates video conferencing consultations with automatic billing calculation. Clients or patients can reach their professional or doctor, regardless of their geographical location and without having to go to their office and without having to manually start and stop a clock.

The invention covers browser activity where browser programs are just application programs and are treated by the present invention like any other program. Browsers interact with files on a local machine and they also interact with files that are accessed via networks such as the internet/intranet. To extend the processes of the present invention to browsers, it is necessary to enhance the data collector to monitor traffic between a particular application and the internet/intranet in addition to the normal traffic between the application and the DOS file system.

As illustrated in FIG. 1, interaction between an application and the internet is performed by a software component known as a network operating system, NOS, 130, which is similar in function and features to a disk operating system, DOS, 118, as previously described in connection with the system 100. A network 132 is illustrated. The technical methods involved in intercepting interactions or traffic between an application and the NOS are slightly different than those between an application and DOS but from a high level they appear the same (i.e., the data collector for NOS watches for file open and close, file read and file write operations just as the data collector for DOS does.

FIG. 16 illustrates a internet/intranet initialization process which is to the DOS initialization which does not actually hook an interrupt but inserts a hook of similar design. The actual running process uses the same identical code to write the collected data to the data collector or disk file. This provides a process for hooking internet/intranet traffic and is similar to the concept of hooking disk traffic. The routing of the data thus collected to a data collector file writer uses exactly the same method used to write keyboard and mouse activity to the file.

FIG. 17 is similar to FIG. 2 and further includes Block 216 which indicates the step of finding a network interface. The network connects non-file system services providers which provide interface such as, for example, telephony interfaces and e-mail provider interfaces. Block 218 indicates that old code is saved. Block 220 inserts system calls to a data collector for network activities.

FIG. 17 is analogous and similar to FIG. 5 and illustrates a network call routine 1700 for an external network provider. Block 1702 extracts information regarding the user and the provider. Block 1704 analyzes information regarding who are active current uses of the provider. Block 1706 constructs a data collection for activities. Block 1708 writes and saves the user activity data collection records. Block 1710 calls the network interface.

FIG. 18 follows Block 1710 and illustrates an additional routine 1800 which saves additional information. Decision Block 1802 determines if there is additional information to be stored. If Yes, that information is stored as illustrated by Block 1804 in the DDC file and returns to the end of the routine.

Network applications of the invention include monitoring of actual activity at a particular Worldwide Web site. Activity can also be monitors between the computer running the data collector and other computers on its network that does not go through the DOS. This activity includes video streams, audio streams, game playing, internet telephony, etc. In general, any kind of conversation (either two-way or one-way) can be monitored and tracked, such as, for example, pay-per-play or pay-per-view. Additional combinations of work done on the local computer and work performed over the network can also be monitored including file access on remote systems and remote data collectors, in which, for example, a data collector is installed on a machine in the field which sends its information over a network to another data collector for concentration at a common site.

As described above, in addition to operating system environments such as DOS, Windows, Macintosh, etc., the invention is useful with a remote server which has application accessed by a user through a network The server itself can collect user activity information. The functionality of the TSR 110 is extended to include a NOS, which is treated as another data store. A browser accesses a data file in a remote computer and uses the NOS as a two-way connection.

For server and browser application the monitoring system determines which users are active and which files or functions are being used by the user.

The foregoing descriptions of specific embodiments of the present invention have been presented for the purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer-implemented automatically-operated user-activity monitoring system for automatically collecting and analyzing information about time and continuous work performed on a computer without manually starting and stopping a clock or having a user specify that work is being performed prior to the user beginning the work, comprising:

automatic data collector means for monitoring certain portions of a user's computer activity;

a hardware abstraction layer for providing monitoring and detection of activity of various types of input devices;

automatic data collector means for logging into a log file certain portions of a user's computer activity;

data analyzer means for determining, by means of rules defining work previously defined by a user, which portions of a user's computer activity constitutes work;

wherein the log file includes a series of events including file activity and one or more external user input activities;

wherein the data analyzer means include means for reading the series of chronologically ordered events from the log file and for categorizing activities as belonging to a certain predetermined task;

wherein for each task a respective timer is provided by the data analyzer means for accumulating actual time worked on a task for time intervals greater than an idle time limit interval;

wherein a respective timer is started by the data analyzer means when an activity for a task is detected and wherein the timer stops after expiration of a preset idle time limit interval;

wherein the timer is restarted when another subsequent activity for a task is detected; and such that when an idle time limit interval is determined to have elapsed in the log file between activities belonging to a work task, means are provided for totaling the time for the task as a work period.

2. The system of claim 1 wherein the hardware abstraction layer includes a software module which is interposed between actual physical user input devices and the automatic data collector means for monitoring certain portions of a user's computer system.

3. The system of claim 1 wherein the log file includes information about items selected from the group consisting of file opens, keystrokes, mouse clicks, and user notes.

4. The system of claim 3 wherein the software module of the hardware abstraction layer translates storage device activities to hard disk activities, selection activities to keyboard activities, and pointer-device activities to mouse activities.

5. The system of claim 1 wherein the data collector means for monitoring certain portions of a user's computer activity includes a resident module which extends the file system of a computer so that detailed records are kept of file activities.

6. The system of claim 1 wherein the data collector means for logging those certain portions of a user's computer activity includes means for keeping records of external input devices.

7. The system of claim 1 wherein the data collector means for logging hose certain portions of a user's computer activity includes means for extending the user interface of a computer so that detailed records of external-user input device activity are kept as a user performs work.

8. The system of claim 1 wherein the data collector means for monitoring certain portions of a user's computer activity includes means for routing information about external user-input device activity to the data collection means and includes means for tabulating and writing such information to a user's disk periodically.

9. The system of claim 8 including means for routing information about user activity to the data collection means through means for filtering such activity.

10. A computer-implemented method for automatically collecting and analyzing information about time and work performed on a computer without the manual starting and stopping of a clock or specifying that work is being performed prior to beginning work, comprising the steps of:

differentiating between multiple types of external user input devices using a hardware abstraction layer;

automatically collecting and logging into a log file certain portions of a user's computer activity;

determining, by means of rules previously defined, which portions of a user's computer activity constitutes a measurable work task;

when a certain user-defined and task-specific time period has elapsed between certain activities in the log file for a given task, accumulating the time as a work period for the given task;

wherein the step of determining which portions of a user's computer activity constitutes a measurable work task includes the steps of:

loading current times for each of a number of events from a cumulative time file;

for each event in the event file:
 (a) getting the event from the log file;
 (b) determining the owner of the task to which the event belongs;
 (c) if an event is to be included in a task, then accumulating job time;
 (d) if an event is not to be included in a task, then checking time duration of the active time for the event;
 (e) checking the active time for the event;

wherein the step of checking the active time for an event includes for each task:
 (a) calculating the difference between a current activity and a previous activity for a task;
 (b) if the difference is greater than an idle time limit interval, accumulating task time; and
 (c) accumulating total time for each task; and writing time data for each task to a file.

11. The method of claim 10 wherein the step of logging includes extending user interface of the computer so that detailed records of external user input device activities are kept as a user performs work.

12. The method of claim 10 wherein the step of monitoring includes routing information about keyboard activity to a data collection means and includes tabulating and writing such information to a disk periodically.

13. The method of claim 12 including routing information about keyboard activity and mouse activity to the data collection means through filters.

14. The method of claim 10 including the step of providing a database and the log file.

15. The method of claim 10 wherein the step of providing the database includes having the database contain a description of which files, directories, and programs define work subsets in a work set.

16. The method of claim 10 wherein the log file records a series of chronologically ordered events including file opens, keystrokes, mouse clicks, user notes, and including the step of reading this data and sorting these activities.

* * * * *